(12) United States Patent
Xu et al.

(10) Patent No.: US 11,451,500 B2
(45) Date of Patent: Sep. 20, 2022

(54) STATE-SHARING PLUG-IN CITRIX WORKSPACE ENVIRONMENT

(71) Applicant: Citrix Systems, Inc., Fort Lauderdale, FL (US)

(72) Inventors: Ke Xu, Nanjing (CN); Zhipan Liu, Nanjing (CN)

(73) Assignee: Citrix Systems, Inc., Fort Lauderdale, FL (US)

(*) Notice: Subject to any disclaimer, the term of this patent is extended or adjusted under 35 U.S.C. 154(b) by 0 days.

(21) Appl. No.: 17/091,678

(22) Filed: Nov. 6, 2020

(65) Prior Publication Data

US 2022/0116345 A1     Apr. 14, 2022

Related U.S. Application Data

(63) Continuation of application No. PCT/CN2020/120557, filed on Oct. 13, 2020.

(51) Int. Cl.
| | | |
|---|---|---|
| G06F 15/16 | (2006.01) | |
| H04L 51/18 | (2022.01) | |
| H04L 9/40 | (2022.01) | |
| H04L 67/143 | (2022.01) | |
| H04L 51/043 | (2022.01) | |
| H04L 67/141 | (2022.01) | |
| H04L 51/224 | (2022.01) | |

(52) U.S. Cl.
CPC ............ *H04L 51/18* (2013.01); *H04L 51/043* (2013.01); *H04L 51/224* (2022.05); *H04L 63/0815* (2013.01); *H04L 67/141* (2013.01); *H04L 67/143* (2013.01)

(58) Field of Classification Search
CPC ....... H04L 51/18; H04L 51/043; H04L 51/24; H04L 63/0815; H04L 67/141; H04L 67/143
See application file for complete search history.

(56) References Cited

U.S. PATENT DOCUMENTS

| | | |
|---|---|---|
| 6,988,128 B1 | 1/2006 | Alexander |
| 7,035,865 B2 | 4/2006 | Doss |
| 7,139,797 B1 | 11/2006 | Yoakum |

(Continued)

FOREIGN PATENT DOCUMENTS

CN     104967644 A     10/2015

OTHER PUBLICATIONS

PCT International Search Report and Written Opinion for Application No. PCT/CN2020/120557 dated Jul. 9, 2021, 9 pages.

(Continued)

*Primary Examiner* — Ryan J Jakovac
(74) *Attorney, Agent, or Firm* — Finch & Maloney PLLC

(57) ABSTRACT

Systems and methods of controlling a state of electronic messaging applications are provided. A system detects a launch of a network application via an embedded browser. The network application is associated with a session identifier of a user. The system identifies one or more electronic messaging applications on a client device of the user. The system transmits, responsive to the launch of the network application associated with the session identifier, an instruction to one or more servers managing the one or more electronic messaging applications to control a state of the one or more electronic messaging applications.

20 Claims, 15 Drawing Sheets

(56) References Cited

U.S. PATENT DOCUMENTS

| | | |
|---|---|---|
| 7,483,969 B2 | 1/2009 | Chavda |
| 7,945,612 B2 | 5/2011 | Raghav |
| 8,345,601 B2 | 1/2013 | Lazaridis |
| 8,352,555 B2 | 1/2013 | Channabasavaiah |
| 8,374,590 B1 | 2/2013 | Mikan |
| 8,478,859 B2 | 7/2013 | McMurry |
| 9,021,031 B1 | 4/2015 | Jansson |
| 9,398,107 B1 | 7/2016 | Rai |
| 9,574,671 B1 | 2/2017 | Amberg |
| 10,368,184 B2 | 7/2019 | Upadhyaya |
| 10,454,855 B2 | 10/2019 | Rife |
| 10,516,964 B2 | 12/2019 | Dotan-Cohen |
| 10,645,088 B1 | 5/2020 | Yanes |
| 10,915,866 B2 * | 2/2021 | Bay ................. H04L 51/22 |
| 2002/0083127 A1 | 6/2002 | Agrawal |
| 2002/0143916 A1 | 10/2002 | Mendiola |
| 2004/0170263 A1 | 9/2004 | Michael |
| 2004/0249776 A1 | 12/2004 | Horvitz |
| 2005/0114777 A1 | 5/2005 | Szeto |
| 2006/0004911 A1 | 1/2006 | Becker |
| 2006/0015609 A1 | 1/2006 | Hagale |
| 2007/0061405 A1 | 3/2007 | Keohane |
| 2008/0005235 A1 | 1/2008 | Hegde |
| 2008/0005294 A1 | 1/2008 | Morris |
| 2008/0140498 A1 | 6/2008 | Setty |
| 2008/0242231 A1 | 10/2008 | Gray |
| 2008/0294772 A1 | 11/2008 | Hagale |
| 2009/0222516 A1 | 9/2009 | Holmes |
| 2009/0262668 A1 | 10/2009 | Hemar |
| 2010/0064014 A1 | 3/2010 | McLaughlin |
| 2011/0072128 A1 | 3/2011 | Carr |
| 2011/0202602 A1 | 8/2011 | Biollo |
| 2012/0296919 A1 | 11/2012 | Sinha |
| 2014/0040345 A1 | 2/2014 | Delos Reyes |
| 2014/0342685 A1 | 11/2014 | Biswas |
| 2015/0074557 A1 | 3/2015 | Reinhardt |
| 2016/0080306 A1 | 3/2016 | Kesarwani |
| 2016/0094938 A1 | 3/2016 | Upadhyaya |
| 2016/0241654 A1 | 8/2016 | Cunico |
| 2016/0275458 A1 | 9/2016 | Meushar |
| 2017/0289076 A1 | 10/2017 | Rife |
| 2019/0190861 A1 | 6/2019 | Nazmi |
| 2019/0205839 A1 | 7/2019 | Dotan-Cohen |
| 2019/0372962 A1 * | 12/2019 | Maria ................. H04L 63/108 |
| 2020/0092382 A1 | 3/2020 | Borkar et al. |
| 2020/0120159 A1 | 4/2020 | Momchilov et al. |
| 2020/0167210 A1 | 5/2020 | Attard et al. |
| 2020/0258001 A1 | 8/2020 | Peterson |
| 2021/0051120 A1 * | 2/2021 | Pottier ................. H04L 51/14 |
| 2021/0126983 A1 | 4/2021 | Bellet |
| 2021/0256786 A1 | 8/2021 | Manam |
| 2021/0263726 A1 | 8/2021 | Stewart |

OTHER PUBLICATIONS

Microsoft Corporation, Lync 2013 For Office 365 Quick Reference IM, Presence, and Contacts, Copyright 2012, pp. 1-2 (Year: 2012).

* cited by examiner

STATE-SHARING PLUG-IN CITRIX WORKSPACE ENVIRONMENT

CROSS-REFERENCE TO RELATED APPLICATION

This application is a continuation of and claims priority to International Application No. PCT/CN2020/120557, titled "A STATE-SHARING PLUG-IN IN CITRIX WORKSPACE ENVIRONMENT," and filed on Oct. 13, 2020, the contents of all of which are hereby incorporated herein by reference in its entirety for all purposes.

BACKGROUND

In network environments, a server can host or provide access to a plurality of resources or applications for a plurality of users.

SUMMARY

This technical solution is directed towards systems and methods of a state-sharing plug-in for a computing workspace environment. A client application executing on a client device can allow a user to access applications (apps) that are served from and/or hosted on one or more servers, such as web applications and SaaS applications (hereafter sometimes generally referred to as network applications). A browser that is embedded or integrated with the client application can render to the user a network application that is accessed or requested via the client application, and can allow for interactivity between the user and the network application. The browser can be referred to as an embedded browser, and the client application with embedded browser (CEB) can be referred to as a workspace application. By using the embedded browser, this technical solution can provide a state sharing plug-in for the embedded browser that can detect a state of an application provided via the embedded browser, identify a local messaging or social application installed on the client device, and communicate, via a single sign-on protocol, an indication to a server that hosts the messaging application to control a state of the messaging application.

For example, this technical solution can determine a state of the user based on whether the user has launched a network application provided via a CEB. The system can set the state of the user based on the launch event via the CEB. Thereafter, the system can synchronize the state of the user determined based on the CEB with one or more other local social applications or messaging applications provided by third-party social application or messaging providers.

At least one aspect of this technical solution is directed to a method of controlling a state of electronic messaging applications. The method can be performed by one or more processors. The method can include the one or more processors detecting a launch of a network application via an embedded browser. The network application can be associated with a session identifier of a user. The method can include the one or more processors identifying one or more electronic messaging applications on a client device of the user. The method can include the one or more processors transmitting an instruction to one or more servers managing the one or more electronic messaging applications. The instruction to the one or more servers can cause the one or more servers to control a state of the one or more electronic messaging applications. The one or more processors can transmit the instruction responsive to the launch of the network application associated with the session identifier.

In some implementations, the method can include the one or more processors identifying based at least in part on the session identifier, authentication credentials for the user for a first electronic messaging application of the one or more electronic messaging applications. The one or more processors can establish, using the authentication credentials, a communication session with a first server of the one or more servers that manages the first electronic messaging application. The one or more processors can transmit, via the communication session, the instruction to control the state of the first electronic messaging application. In some implementations, the one or more processors can establish the communication session using a single sign-on authentication technique.

The one or more processors can control the state to disable transmission of electronic messages via the one or more electronic messaging applications to the client device of the user. The one or more processors can control the state to disable notification of transmission of electronic messages via the one or more electronic messaging applications to the user. The one or more processors can transmit the instruction to update the state to a busy state. The one or more processors can identify the one or more electronic messaging applications executing on the client device.

The one or more processors can terminate network applications previously launched via the embedded browser. The one or more processors can transmit, responsive to termination of the network applications, a second instruction to the one or more electronic messaging applications to update the state to a second state different from the state. The second state can allow delivery of notifications related to electronic messages transmitted to the user.

The one or more processors can detect the launch of the network application by a client application executing on the client device. A remote server hosting the network application can transmit, to the one or more servers managing the one or more electronic messaging applications, the instruction to control the state of the one or more electronic messaging applications.

The one or more processors can display the state of the one or more electronic messaging applications for the user via a user interface element provided by the embedded browser that launches the network application.

At least one aspect of this technical solution is directed to a system to control a state of electronic messaging applications. The system can include one or more processors and memory. The one or more processors can detect a launch of a network application via an embedded browser, the network application associated with a session identifier of a user. The one or more processors can identify one or more electronic messaging applications on a client device of the user. The one or more processors can transmit, responsive to the launch of the network application associated with the session identifier, an instruction to one or more servers managing the one or more electronic messaging applications to control a state of the one or more electronic messaging applications.

In some implementations, the one or more processors can identify, based at least in part on the session identifier, authentication credentials for the user for a first electronic messaging application of the one or more electronic messaging applications. The one or more processors can establish, using the authentication credentials, a communication session with a first server of the one or more servers that manages the first electronic messaging application. The one or more processors can transmit, via the communication session, the instruction to control the state of the first electronic messaging application.

The one or more processors can establish the communication session using a single sign-on authentication technique. The one or more processors can control the state to disable transmission of electronic messages via the one or more electronic messaging applications to the client device of the user. The one or more processors can control the state to disable notification of transmission of electronic messages via the one or more electronic messaging applications to the user. The one or more processors can transmit the instruction to update the state to a busy state.

In some implementations, a client application executing on the client device can detect the launch of the network application via the embedded browser, and transmit the instruction to the one or more servers responsive to detection of the launch.

At least one aspect is directed to a system to control a state of electronic messaging applications. The system can include an embedded web browser that executes on a client device having memory and one or more processors. The system can include a client application in communication with the embedded web browser. The client application can detect a launch of a network application via the embedded web browser. The network application can be associated with a session identifier of a user. The client application can identify one or more electronic messaging applications on the client device. The client application can provide, responsive to the launch of the network application associated with the session identifier, an instruction to one or more servers managing the one or more electronic messaging applications to control a state of the one or more electronic messaging applications.

In implementations, the client application can identify, based at least in part on the session identifier, authentication credentials for the user for a first electronic messaging application of the one or more electronic messaging applications. The client application can establish, using the authentication credentials, a communication session with a first server of the one or more servers that manages the first electronic messaging application. The client application can transmit, via the communication session, the instruction to control the state of the first electronic messaging application.

The client application can transmit, to a remote server, the instruction to control the state of the one or more electronic messaging applications. The remote server can generate one or more instructions to transmit to the one or more servers managing the one or more electronic messaging applications to control the state of the one or more electronic messaging applications.

The details of various embodiments of the disclosure are set forth in the accompanying drawings and the description below.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

FIG. 6 is an example representation of an implementation for browser redirection using a secure browser plug-in;

DETAILED DESCRIPTION

Figure 1A:
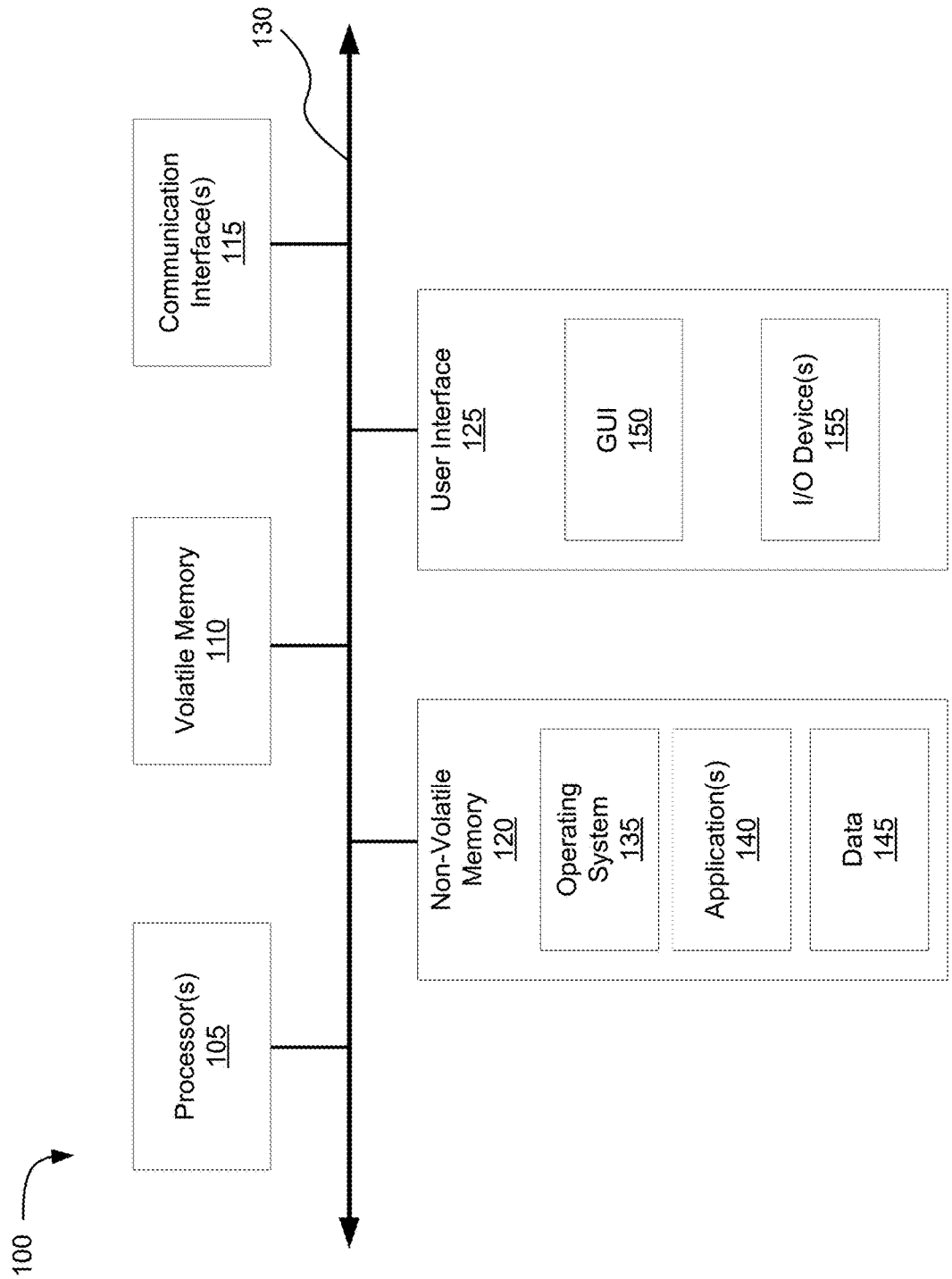
FIG. 1A is a block diagram of embodiments of a computing device.

Systems and methods for providing a state-sharing plug-in in a computing workspace environment are provided. A client application executing on a client device can allow a user to access applications that are served from and/or hosted on one or more servers, such as web applications and SaaS applications or network applications. A browser that is embedded or integrated with the client application can render to the user a network application that is accessed or requested via the client application, and can allow for interactivity between the user and the network application. The browser can be referred to as an embedded browser, and the client application with embedded browser (CEB) can be referred to as a workspace application. The client application can establish a secure connection to the one or more servers to provide an application session for the user to access the network application using the client device and the embedded browser. The embedded browser can be integrated with the client application such that traffic related to the network application can be routed through and/or processed in the client application, which can provide the client application with real-time visibility to the traffic (e.g., when decrypted through the client application), and user interactions and behavior. The embedded browser can provide a seamless experience to a user as the network application is requested via the user interface (shared by the client application and the embedded browser) and rendered through the embedded browser within the same user interface. By using the embedded browser, this technical solution can provide a state sharing plug-in for the embedded browser that can detect a state of an application provided via the embedded browser, identify a local messaging application installed on the client device, and communicate, via a single sign-on protocol, an indication to a server that hosts the messaging application to control a state of the messaging application.

For example, users of the workspace can collaborate and keep being productive while engaging with other users via collaboration tools, such as instant messaging tools, direct messaging tools, group messaging tools, etc. While these tools allow the user to conveniently exchange messages with other users, the computing workspace may not be able to detect and update a current status of the user, such as idle or busy. Thus, it can be challenging or not possible for the messaging application to automatically detect the current state and update the state accordingly, which can result in unnecessary or wasted electronic messages being exchange amongst client devices, thereby resulting in wasted computing resource utilization or network bandwidth utilization. Furthermore, providing messages irrespective of the current state of the user may introduce delays or latencies in associated with network applications being utilized by the user, as well as degrade the user interface or computing user experience.

Thus, systems and methods of this technical solution provide state sharing plug-in for the CEB that can determine a current state associated with the CEB or network application. This technical solution can allow the user to customize or set their state, or the plug-in can automatically detect the state via a client agent or engine. Upon determining the state, this technical solution can leverage a single sign-on protocol to access a remote server hosting the electronic messaging application and control the state of the electronic messaging application.

For purposes of reading the description of the various embodiments below, the following descriptions of the sections of the specification and their respective contents can be helpful:

Section A describes a computing environment which can be useful for practicing embodiments described herein.

Section B describes systems and methods for an embedded browser.

Section C describes systems and methods for a state sharing plug-in for the embedded browser.

A. Computing Environment

Prior to discussing the specifics of embodiments of the systems and methods of for securing offline data (e.g., browser offline data) for shared accounts, it may be helpful to discuss the computing environments in which such embodiments may be deployed.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Figure 1B:
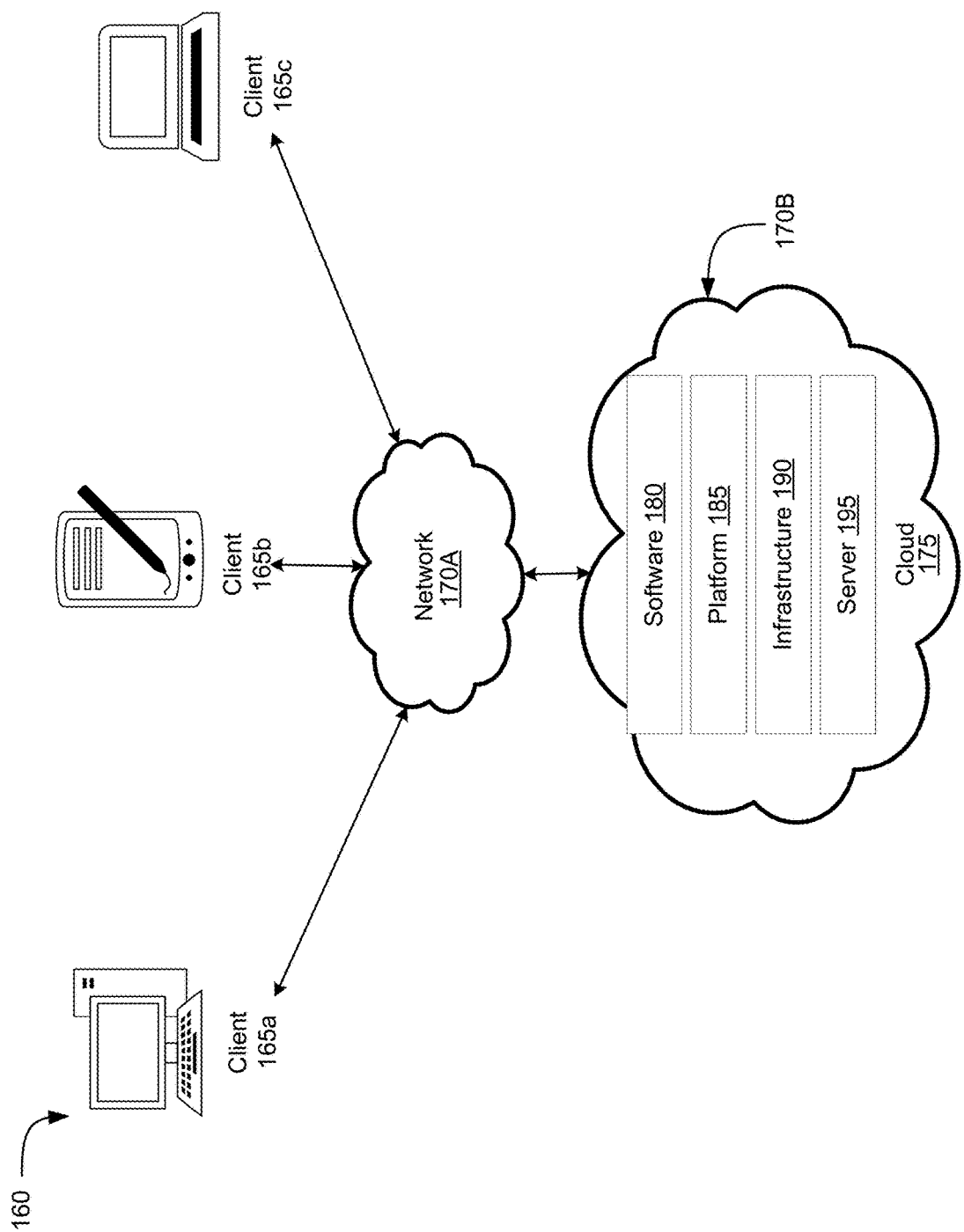
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 160 may include one or more clients 165a-165n, in communication with a cloud 175 over one or more networks 170A, 170B. Clients 165 may include, e.g., thick clients, thin clients, and zero clients. The cloud 175 may include back end platforms, e.g., servers 195, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Systems and Methods for an Embedded Browser

The present disclosure is directed towards systems and methods of an embedded browser. A client application executing on a client device can allow a user to access applications (apps) that are served from and/or hosted on one or more servers, such as web applications and software-as-a-service (SaaS) applications (hereafter sometimes generally referred to as network applications). A browser that is embedded or integrated with the client application can render to the user a network application that is accessed or requested via the client application, and can enable interactivity between the user and the network application. The browser is sometimes referred to as an embedded browser, and the client application with embedded browser (CEB) is sometimes referred to as a workspace application. The client application can establish a secure connection to the one or more servers to provide an application session for the user to access the network application using the client device and the embedded browser. The embedded browser can be integrated with the client application to ensure that traffic related to the network application is routed through and/or processed in the client application, which can provide the client application with real-time visibility to the traffic (e.g., when decrypted through the client application), and user interactions and behavior. The embedded browser can provide a seamless experience to a user as the network application is requested via the user interface (shared by the client application and the embedded browser) and rendered through the embedded browser within the same user interface.

The client application can terminate one end of a secured connection established with a server of a network application, such as a secure sockets layer (SSL) virtual private network (VPN) connection. The client application can receive encrypted traffic from the network application, and can decrypt the traffic before further processing (e.g., rendering by the embedded browser). The client application can monitor the received traffic (e.g., in encrypted packet form), and also have full visibility into the decrypted data stream and/or the SSL stack. This visibility can allow the client application to perform or facilitate policy-based management (e.g., including data loss prevention (DLP) capabilities), application control (e.g., to improve performance, service level), and collection and production of analytics. For instance, the local CEB can provide an information technology (IT) administrator with a controlled system for deploying web and SaaS applications through the CEB, and allow the IT administrator to set policies or configurations via the CEB for performing any of the forgoing activities.

Many web and SaaS delivered applications connect from web servers to generic browsers (e.g., Internet Explorer, Firefox, and so on) of users. Once authenticated, the entire session of such a network application is encrypted. However, in this scenario, an administrator may not have visibility, analytics, or control of the content entering the network application from the user's digital workspace, or the content leaving the network application and entering the user's digital workspace. Moreover, content of a network application viewed in a generic browser can be copied or downloaded (e.g., by a user or program) to potentially any arbitrary application or device, resulting in a possible breach in data security.

This present systems and methods can ensure that traffic associated with a network application is channeled through a CEB. By way of illustration, when a user accesses a SaaS web service with security assertion markup language (SAML) enabled for instance, the corresponding access request can be forwarded to a designated gateway service that determines, checks or verifies if the CEB was used to make the access request. Responsive to determining that a CEB was used to make the access request, the gateway service can perform or provide authentication and single-sign-on (SSO), and can allow the CEB to connect directly to the SaaS web service. Encryption (e.g., standard encryption) can be used for the application session between the CEB and the SaaS web service. When the content from the web service is unencrypted in the CEB to the viewed via the embedded browser, and/or when input is entered via the CEB, the CEB can provide added services on selective application-related information for control and analytics for instance. For example, an analytics agent or application programming interface (API) can be embedded in the CEB to provide or perform the added services.

The CEB (sometimes referred to as workspace application or receiver) can interoperate with one or more gateway services, intermediaries and/or network servers (sometimes collectively referred to as cloud services or Citrix Cloud) to provide access to a network application. Features and elements of an environment related to the operation of an embodiment of cloud services are described below.

Figure 2:
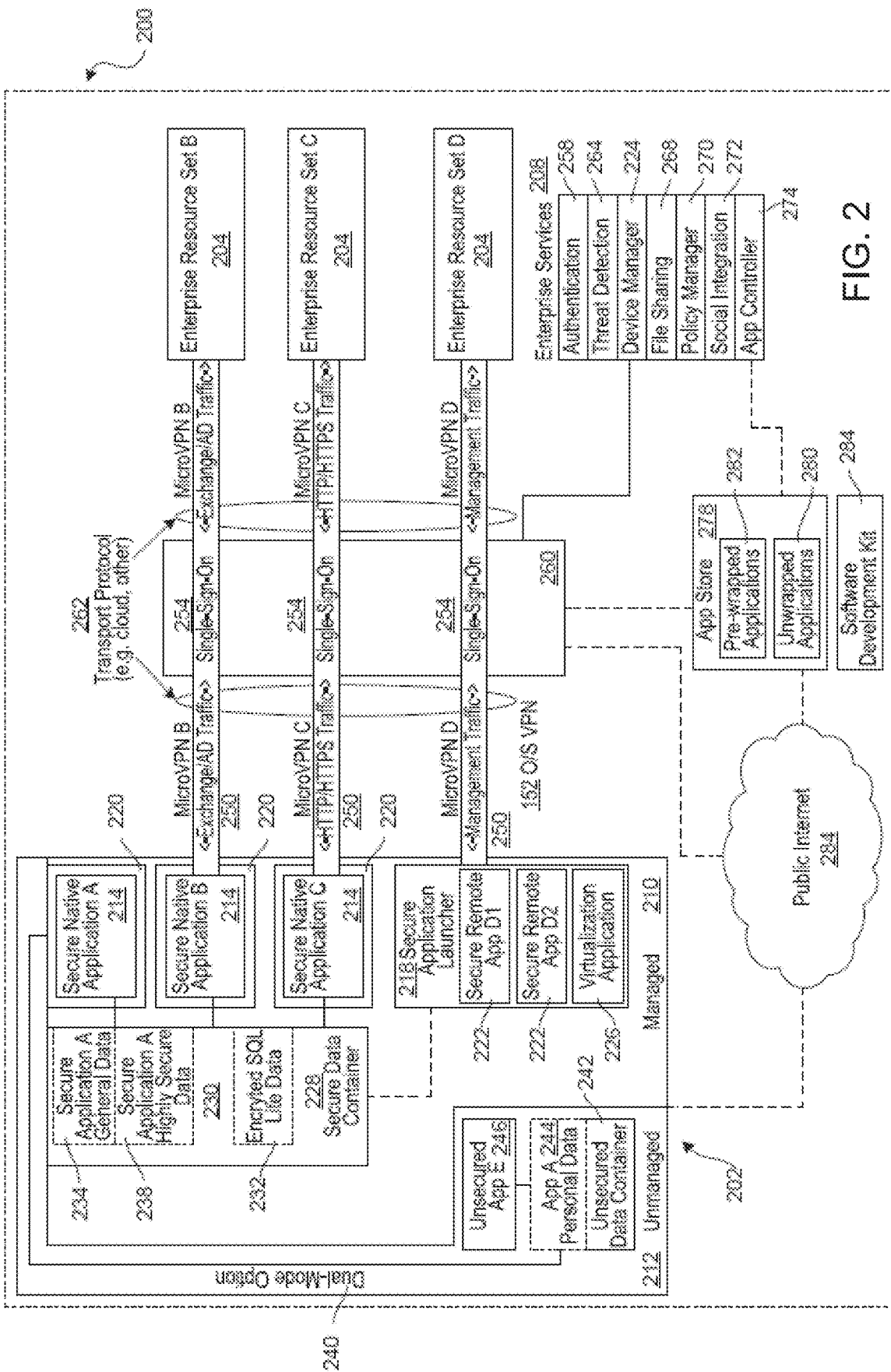
FIG. 2 is a block diagram of an illustrative embodiment of cloud services for use in accessing resources.

FIG. 2 illustrates an embodiment of cloud services for use in accessing resources including network applications. The cloud services can include an enterprise mobility technical architecture 200, which can include an access gateway 260 in one illustrative embodiment. The architecture can be used in a bring-your-own-device (BYOD) environment for instance. The architecture can enable a user of a client device 204 (e.g., a mobile or other device) to both access enterprise or personal resources from a client device 202, and use the client device 204 for personal use. The user can access such enterprise resources 204 or enterprise services 208 via a client application executing on the client device 204. The user can access such enterprise resources 204 or enterprise services 208 using a client device 204 that is purchased by the user or a client device 202 that is provided by the enterprise to user. The user can utilize the client device 202 for business use only or for business and personal use. The client device can run an iOS operating system, and Android operating system, or the like. The enterprise can choose to implement policies to manage the client device 204. The policies can be implanted through a firewall or gateway in such a way that the client device can be identified, secured or security verified, and provided selective or full access to the enterprise resources. The policies can be client device management policies, mobile application management policies, mobile data management policies, or some combination of client device, application, and data management policies. A client device 204 that is managed through the application of client device management policies can be referred to as an enrolled device. The client device management policies can be applied via the client application for instance.

In some embodiments, the operating system of the client device can be separated into a managed partition 210 and an unmanaged partition 212. The managed partition 210 can have policies applied to it to secure the applications running on and data stored in the managed partition. The applications running on the managed partition can be secure applications. In other embodiments, all applications can execute a set of one or more policy files received separate from the application, and which define one or more security parameters, features, resource restrictions, and/or other access controls that are enforced by the client device management system when that application is executing on the device. By operating using their respective policy file(s), each application can be allowed or restricted from communications with one or more other applications and/or resources, thereby creating a virtual partition. Thus, as used herein, a partition can refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps can be restricted to only be able to communicate with other managed apps and trusted enterprise resources, thereby creating a virtual partition that is not accessible by unmanaged apps and devices.

The secure applications can be email applications, web browsing applications, software-as-a-service (SaaS) access applications, Windows Application access applications, and the like. The client application can include a secure application launcher 218. The secure applications can be secure native applications 214, secure remote applications 222 executed by the secure application launcher 218, virtualization applications 226 executed by the secure application launcher 218, and the like. The secure native applications 214 can be wrapped by a secure application wrapper 220. The secure application wrapper 220 can include integrated policies that are executed on the client device 202 when the secure native application is executed on the device. The secure application wrapper 220 can include meta-data that points the secure native application 214 running on the client device 202 to the resources hosted at the enterprise that the secure native application 214 can require to complete the task requested upon execution of the secure native application 214. The secure remote applications 222 executed by a secure application launcher 218 can be executed within the secure application launcher application 218. The virtualization applications 226 executed by a secure application launcher 218 can utilize resources on the client device 202, at the enterprise resources 204, and the like. The resources used on the client device 202 by the virtualization applications 226 executed by a secure application launcher 218 can include user interaction resources, processing resources, and the like. The user interaction resources can be used to collect and transmit keyboard input, mouse input, camera input, tactile input, audio input, visual input, gesture input, and the like. The processing resources can be used to present a user interface, process data received from the enterprise resources 204, and the like. The resources used at the enterprise resources 204 by the virtualization applications 226 executed by a secure application launcher 218 can include user interface generation resources, processing resources, and the like. The user interface generation resources can be used to assemble a user interface, modify a user interface, refresh a user interface, and the like. The processing resources can be used to create information, read information, update information, delete information, and the like. For example, the virtualization application can record user interactions associated with a graphical user interface (GUI) and communicate them to a server application where the server application can use the user interaction data as an input to the application operating on the server. In this arrangement, an enterprise can elect to maintain the application on the server side as well as data, files, etc., associated with the application. While an enterprise can elect to "mobilize" some applications using the principles herein by securing them for deployment on the client device (e.g., via the client application), this arrangement can also be elected for certain applications. For example, while some applications can be secured for use on the client device, others might not be prepared or appropriate for deployment on the client device so the enterprise can elect to provide the mobile user access to the unprepared applications through virtualization techniques. As another example, the enterprise can have large complex applications with large and complex data sets (e.g., material resource planning applications) where it would be very difficult, or otherwise undesirable, to customize the application for the client device so the enterprise can elect to provide access to the application through virtualization techniques. As yet another example, the enterprise can have an application that maintains highly secured data (e.g., human resources data, customer data, engineering data) that can be deemed by the enterprise as too sensitive for even the secured mobile environment so the enterprise can elect to use virtualization techniques to permit mobile access to such applications and data. An enterprise can elect to provide both fully secured and fully functional applications on the client device. The enterprise can use a client application, which can include a virtualization application, to allow access to applications that are deemed more properly operated on the server side. In an embodiment, the virtualization application can store some data, files, etc., on the mobile phone in one of the secure storage locations. An enterprise, for example, can elect to allow certain information to be stored on the phone while not permitting other information.

In connection with the virtualization application, as described herein, the client device can have a virtualization application that is designed to present GUIs and then record user interactions with the GUI. The virtualization application can communicate the user interactions to the server side to be used by the server side application as user interactions with the application. In response, the application on the server side can transmit back to the client device a new GUI. For example, the new GUI can be a static page, a dynamic page, an animation, or the like, thereby providing access to remotely located resources.

The secure applications can access data stored in a secure data container 228 in the managed partition 210 of the client device. The data secured in the secure data container can be accessed by the secure wrapped applications 214, applications executed by a secure application launcher 222, virtualization applications 226 executed by a secure application launcher 218, and the like. The data stored in the secure data container 228 can include files, databases, and the like. The data stored in the secure data container 228 can include data restricted to a specific secure application 230, shared among secure applications 232, and the like. Data restricted to a secure application can include secure general data 234 and highly secure data 238. Secure general data can use a strong form of encryption such as Advanced Encryption Standard (AES) 128-bit encryption or the like, while highly secure data 238 can use a very strong form of encryption such as AES 256-bit encryption. Data stored in the secure data container 228 can be deleted from the device upon receipt of a command from the device manager 224. The secure applications can have a dual-mode option 240. The dual mode option 240 can present the user with an option to operate the secured application in an unsecured or unmanaged mode. In an unsecured or unmanaged mode, the secure applications can access data stored in an unsecured data container 242 on the unmanaged partition 212 of the client device 202. The data stored in an unsecured data container can be personal data 244. The data stored in an unsecured data container 242 can also be accessed by unsecured applications 248 that are running on the unmanaged partition 212 of the client device 202. The data stored in an unsecured data container 242 can remain on the client device 202 when the data stored in the secure data container 228 is deleted from the client device 202. An enterprise can want to delete from the client device selected or all data, files, and/or applications owned, licensed or controlled by the enterprise (enterprise data) while leaving or otherwise preserving personal data, files, and/or applications owned, licensed or controlled by the user (personal data). This operation can be referred to as a selective wipe. With the enterprise and personal data arranged as described herein, an enterprise can perform a selective wipe.

The client device 202 can connect to enterprise resources 204 and enterprise services 208 at an enterprise, to the public Internet 248, and the like. The client device can connect to enterprise resources 204 and enterprise services 208 through virtual private network connections. The virtual private network connections, also referred to as microVPN or application-specific VPN, can be specific to particular applications (e.g., as illustrated by microVPNs 250), particular devices, particular secured areas on the client device (e.g., as illustrated by O/S VPN 252), and the like. For example, each of the wrapped applications in the secured area of the phone can access enterprise resources through an application specific VPN such that access to the VPN would be granted based on attributes associated with the application, possibly in conjunction with user or device attribute information. The virtual private network connections can carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections can support and enable single-sign-on authentication processes 254. The single-sign-on processes can allow a user to provide a single set of authentication credentials, which are then verified by an authentication service 258. The authentication service 258 can then grant to the user access to multiple enterprise resources 204, without requiring the user to provide authentication credentials to each individual enterprise resource 204.

The virtual private network connections can be established and managed by an access gateway 260. The access gateway 260 can include performance enhancement features that manage, accelerate, and improve the delivery of enterprise resources 204 to the client device 202. The access gateway can also re-route traffic from the client device 202 to the public Internet 248, enabling the client device 202 to access publicly available and unsecured applications that run on the public Internet 248. The client device can connect to the access gateway via a transport network 262. The transport network 262 can use one or more transport protocols and can be a wired network, wireless network, cloud network, local area network, metropolitan area network, wide area network, public network, private network, and the like.

The enterprise resources 204 can include email servers, file sharing servers, SaaS/Web applications, Web application servers, Windows application servers, and the like. Email servers can include Exchange servers, Lotus Notes servers, and the like. File sharing servers can include ShareFile servers, and the like. SaaS applications can include Salesforce, and the like. Windows application servers can include any application server that is built to provide applications that are intended to run on a local Windows operating system, and the like. The enterprise resources 204 can be premise-based resources, cloud based resources, and the like. The enterprise resources 204 can be accessed by the client device 202 directly or through the access gateway 260. The enterprise resources 204 can be accessed by the client device 202 via a transport network 262. The transport network 262 can be a wired network, wireless network, cloud network, local area network, metropolitan area network, wide area network, public network, private network, and the like.

Cloud services can include an access gateway 260 and/or enterprise services 208. The enterprise services 208 can include authentication services 258, threat detection services 264, device manager services 224, file sharing services 268, policy manager services 270, social integration services 272, application controller services 274, and the like. Authentication services 258 can include user authentication services, device authentication services, application authentication services, data authentication services and the like. Authentication services 258 can use certificates. The certificates can be stored on the client device 202, by the enterprise resources 204, and the like. The certificates stored on the client device 202 can be stored in an encrypted location on the client device, the certificate can be temporarily stored on the client device 202 for use at the time of authentication, and the like. Threat detection services 264 can include intrusion detection services, unauthorized access attempt detection services, and the like. Unauthorized access attempt detection services can include unauthorized attempts to access devices, applications, data, and the like. Device management services 224 can include configuration, provisioning, security, support, monitoring, reporting, and decommissioning services. File sharing services 268 can include file management services, file storage services, file collaboration services, and the like. Policy manager services 270 can include device policy manager services, application policy manager services, data policy manager services, and the like. Social integration services 272 can include contact integration services, collaboration services, integration with social networks such as Facebook, Twitter, and LinkedIn, and the like. Application controller services 274 can include management services, provisioning services, deployment services, assignment services, revocation services, wrapping services, and the like.

The enterprise mobility technical architecture 200 can include an application store 278. The application store 278 can include unwrapped applications 280, pre-wrapped applications 282, and the like. Applications can be populated in the application store 278 from the application controller 274. The application store 278 can be accessed by the client device 202 through the access gateway 260, through the public Internet 248, or the like. The application store can be provided with an intuitive and easy to use User Interface.

A software development kit 284 can provide a user the capability to secure applications selected by the user by providing a secure wrapper around the application. An application that has been wrapped using the software development kit 284 can then be made available to the client device 202 by populating it in the application store 278 using the application controller 274.

The enterprise mobility technical architecture 200 can include a management and analytics capability. The management and analytics capability can provide information related to how resources are used, how often resources are used, and the like. Resources can include devices, applications, data, and the like. How resources are used can include which devices download which applications, which applications access which data, and the like. How often resources are used can include how often an application has been downloaded, how many times a specific set of data has been accessed by an application, and the like.

Figure 3:
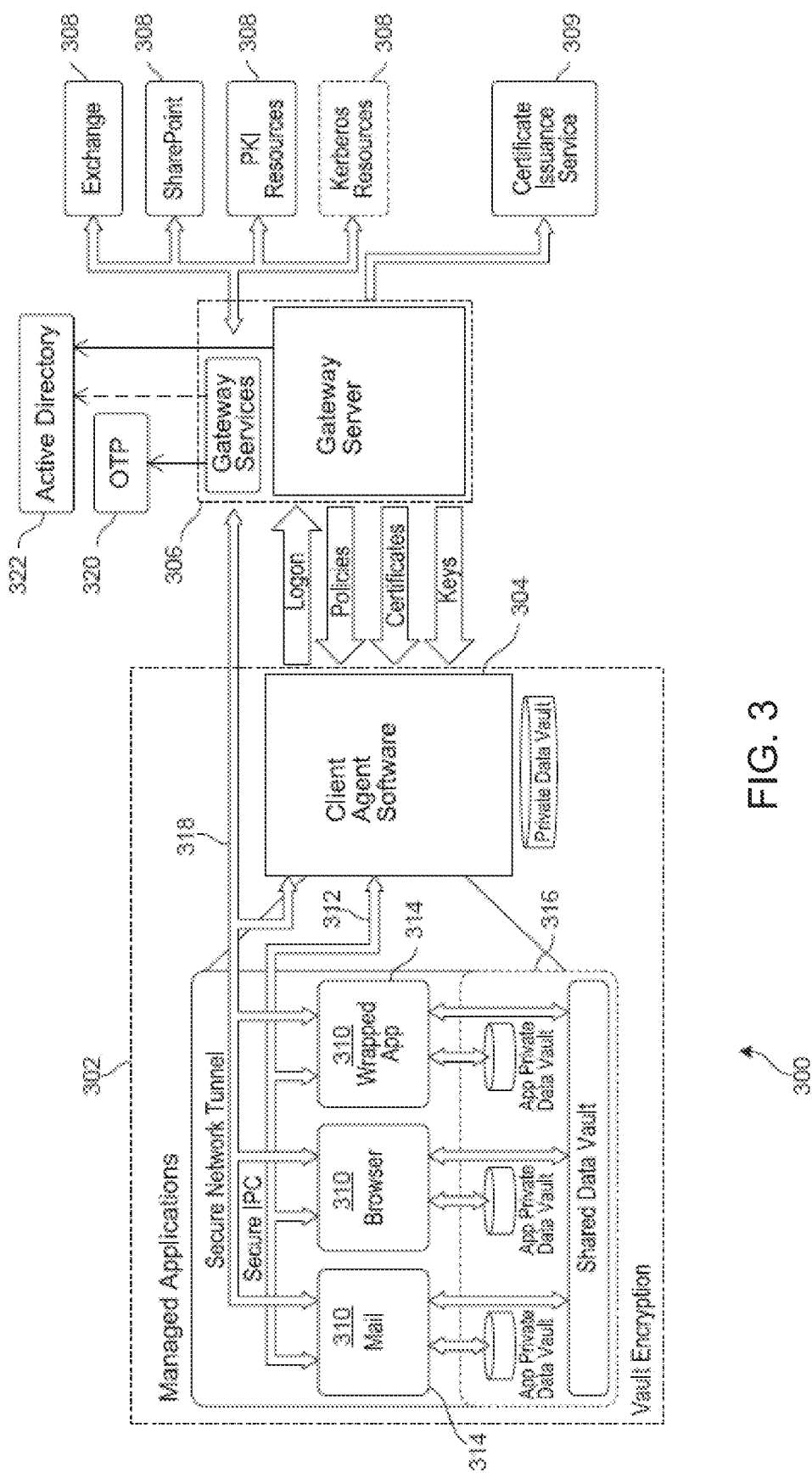
FIG. 3 is a block diagram of an example embodiment of an enterprise mobility management system.

FIG. 3 depicts is an illustrative embodiment of an enterprise mobility management system 300. Some of the components of the mobility management system 200 described above with reference to FIG. 2 have been omitted for the sake of simplicity. The architecture of the system 300 depicted in FIG. 3 is similar in many respects to the architecture of the system 200 described above with reference to FIG. 2 and can include additional features not mentioned above.

In this case, the left hand side represents an enrolled client device 302 with a client agent 304, which interacts with gateway server 306 to access various enterprise resources 308 and services 309 such as Web or SasS applications, Exchange, Sharepoint, public-key infrastructure (PKI) Resources, Kerberos Resources, Certificate Issuance service, as shown on the right hand side above. The gateway server 306 can include embodiments of features and functionalities of the cloud services, such as access gateway 260 and application controller functionality. Although not specifically shown, the client agent 304 can be part of, and/or interact with the client application which can operate as an enterprise application store (storefront) for the selection and/or downloading of network applications.

The client agent 304 can act as a UI (user interface) intermediary for Windows apps/desktops hosted in an Enterprise data center, which are accessed using the High-Definition User Experience (HDX) or Independent Computing Architecture (ICA) display remoting protocol. The client agent 304 can also support the installation and management of native applications on the client device 302, such as native iOS or Android applications. For example, the managed applications 310 (mail, browser, wrapped application) shown in the figure above are native applications that execute locally on the device. Client agent 304 and application management framework of this architecture act to provide policy driven management capabilities and features such as connectivity and SSO (single sign on) to enterprise resources/services 308. The client agent 304 handles primary user authentication to the enterprise, for instance to access gateway (AG) with SSO to other gateway server components. The client agent 304 obtains policies from gateway server 306 to control the behavior of the managed applications 310 on the client device 302.

The Secure interprocess communication (IPC) links 312 between the native applications 310 and client agent 304 represent a management channel, which allows client agent to supply policies to be enforced by the application management framework 314 "wrapping" each application. The IPC channel 312 also allows client agent 304 to supply credential and authentication information that enables connectivity and SSO to enterprise resources 308. Finally the IPC channel 312 allows the application management framework 314 to invoke user interface functions implemented by client agent 304, such as online and offline authentication.

Communications between the client agent 304 and gateway server 306 are essentially an extension of the management channel from the application management framework 314 wrapping each native managed application 310. The application management framework 314 requests policy information from client agent 304, which in turn requests it from gateway server 306. The application management framework 314 requests authentication, and client agent 304 logs into the gateway services part of gateway server 306 (also known as NetScaler access gateway). Client agent 304 can also call supporting services on gateway server 306, which can produce input material to derive encryption keys for the local data vaults 316, or provide client certificates which can enable direct authentication to PKI protected resources, as more fully explained below.

In more detail, the application management framework 314 "wraps" each managed application 310. This can be incorporated via an explicit build step, or via a post-build processing step. The application management framework 314 can "pair" with client agent 304 on first launch of an application 310 to initialize the Secure IPC channel and obtain the policy for that application. The application management framework 314 can enforce relevant portions of the policy that apply locally, such as the client agent login dependencies and some of the containment policies that restrict how local OS services can be used, or how they can interact with the application 310.

The application management framework 314 can use services provided by client agent 304 over the Secure IPC channel 312 to facilitate authentication and internal network access. Key management for the private and shared data vaults 316 (containers) can be also managed by appropriate interactions between the managed applications 310 and client agent 304. Vaults 316 can be available only after online authentication, or can be made available after offline authentication if allowed by policy. First use of vaults 316 can require online authentication, and offline access can be limited to at most the policy refresh period before online authentication is again required.

Network access to internal resources can occur directly from individual managed applications 310 through access gateway 306. The application management framework 314 is responsible for orchestrating the network access on behalf of each application 310. Client agent 304 can facilitate these network connections by providing suitable time limited secondary credentials obtained following online authentication. Multiple modes of network connection can be used, such as reverse web proxy connections and end-to-end VPN-style tunnels 318.

The Mail and Browser managed applications 310 can have special status and can make use of facilities that might not be generally available to arbitrary wrapped applications. For example, the Mail application can use a special background network access mechanism that allows it to access Exchange over an extended period of time without requiring a full AG logon. The Browser application can use multiple private data vaults to segregate different kinds of data.

This architecture can support the incorporation of various other security features. For example, gateway server 306 (including its gateway services) in some cases might not need to validate active directory (AD) passwords. It can be left to the discretion of an enterprise whether an AD password is used as an authentication factor for some users in some situations. Different authentication methods can be used if a user is online or offline (i.e., connected or not connected to a network).

Step up authentication is a feature wherein gateway server 306 can identify managed native applications 310 that are allowed to have access to more sensitive data using strong authentication, and ensure that access to these applications is only permitted after performing appropriate authentication, even if this means a re-authentication is requested from the user after a prior weaker level of login.

Another security feature of this solution is the encryption of the data vaults 316 (containers) on the client device 302. The vaults 316 can be encrypted so that all on-device data including clipboard/cache data, files, databases, and configurations are protected. For on-line vaults, the keys can be stored on the server (gateway server 306), and for off-line vaults, a local copy of the keys can be protected by a user password or biometric validation. When data is stored locally on the device 302 in the secure container 316, it is preferred that a minimum of AES 256 encryption algorithm be utilized.

Other secure container features can also be implemented. For example, a logging feature can be included, wherein all security events happening inside an application 310 are logged and reported to the backend. Data wiping can be supported, such as if the application 310 detects tampering, associated encryption keys can be written over with random data, leaving no hint on the file system that user data was destroyed. Screenshot protection is another feature, where an application can prevent any data from being stored in screenshots. For example, the key window's hidden property can be set to YES. This can cause whatever content is currently displayed on the screen to be hidden, resulting in a blank screenshot where any content would normally reside.

Local data transfer can be prevented, such as by preventing any data from being locally transferred outside the application container, e.g., by copying it or sending it to an external application. A keyboard cache feature can operate to disable the autocorrect functionality for sensitive text fields. SSL certificate validation can be operable so the application specifically validates the server SSL certificate instead of it being stored in the keychain. An encryption key generation feature can be used such that the key used to encrypt data on the device is generated using a passphrase or biometric data supplied by the user (if offline access is required). It can be XORed with another key randomly generated and stored on the server side if offline access is not required. Key Derivation functions can operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors can be used in encryption methods. An initialization vector might cause multiple copies of the same encrypted data to yield different cipher text output, preventing both replay and cryptanalytic attacks. This can also prevent an attacker from decrypting any data even with a stolen encryption key. Further, authentication then decryption can be used, wherein application data is decrypted only after the user has authenticated within the application. Another feature can relate to sensitive data in memory, which can be kept in memory (and not in disk) only when it's needed. For example, login credentials can be wiped from memory after login, and encryption keys and other data inside objective-C instance variables are not stored, as they can be easily referenced. Instead, memory can be manually allocated for these.

An inactivity timeout can be implemented via the CEB, wherein after a policy-defined period of inactivity, a user session is terminated.

Data leakage from the application management framework 314 can be prevented in other ways. For example, when an application 310 is put in the background, the memory can be cleared after a predetermined (configurable) time period. When backgrounded, a snapshot can be taken of the last displayed screen of the application to fasten the foregrounding process. The screenshot can contain confidential data and hence should be cleared.

Another security feature relates to the use of an OTP (one time password) 320 without the use of an AD (active directory) 322 password for access to one or more applications. In some cases, some users do not know (or are not permitted to know) their AD password, so these users can authenticate using an OTP 320 such as by using a hardware OTP system like SecurID (OTPs can be provided by different vendors also, such as Entrust or Gemalto). In some cases, after a user authenticates with a user ID, a text is sent to the user with an OTP 320. In some cases, this can be implemented only for online use, with a prompt being a single field.

An offline password can be implemented for offline authentication for those applications 310 for which offline use is permitted via enterprise policy. For example, an enterprise can want storefront to be accessed in this manner. In this case, the client agent 304 can require the user to set a custom offline password and the AD password is not used. Gateway server 306 can provide policies to control and enforce password standards with respect to the minimum length, character class composition, and age of passwords, such as described by the standard Windows Server password complexity requirements, although these requirements can be modified.

Another feature relates to the enablement of a client side certificate for certain applications 310 as secondary credentials (for the purpose of accessing PKI protected web resources via the application management framework micro VPN feature). For example, an application can utilize such a certificate. In this case, certificate-based authentication using ActiveSync protocol can be supported, wherein a certificate from the client agent 304 can be retrieved by gateway server 306 and used in a keychain. Each managed application can have one associated client certificate, identified by a label that is defined in gateway server 306.

Gateway server 306 can interact with an Enterprise special purpose web service to support the issuance of client certificates to allow relevant managed applications to authenticate to internal PKI protected resources.

The client agent 304 and the application management framework 314 can be enhanced to support obtaining and using client certificates for authentication to internal PKI protected network resources. More than one certificate can be supported, such as to match various levels of security and/or separation requirements. The certificates can be used by the Mail and Browser managed applications, and ultimately by arbitrary wrapped applications (provided those applications use web service style communication patterns where it is reasonable for the application management framework to mediate https requests).

Application management client certificate support on iOS can rely on importing a public-key cryptography standards (PKCS) 12 BLOB (Binary Large Object) into the iOS keychain in each managed application for each period of use. Application management framework client certificate support can use a HTTPS implementation with private in-memory key storage. The client certificate might never be present in the iOS keychain and might not be persisted except potentially in "online-only" data value that is strongly protected.

Mutual SSL or TLS can also be implemented to provide additional security by requiring that a client device 302 is authenticated to the enterprise, and vice versa. Virtual smart cards for authentication to gateway server 306 can also be implemented.

Both limited and full Kerberos support can be additional features. The full support feature relates to an ability to do full Kerberos login to Active Directory (AD) 322, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which can automatically occur upon jail-break or rooting detections, and occur as a pushed command from administration console, and can include a remote wipe functionality even when an application 310 is not running.

A multi-site architecture or configuration of enterprise application store and an application controller can be supported that allows users to be service from one of several different locations in case of failure.

In some cases, managed applications 310 can be allowed to access a certificate and private key via an API (example OpenSSL). Trusted managed applications 310 of an enterprise can be allowed to perform specific Public Key operations with an application's client certificate and private key. Various use cases can be identified and treated accordingly, such as when an application behaves like a browser and no certificate access is used, when an application reads a certificate for "who am I," when an application uses the certificate to build a secure session token, and when an application uses private keys for digital signing of important data (e.g., transaction log) or for temporary data encryption.

Figure 4:
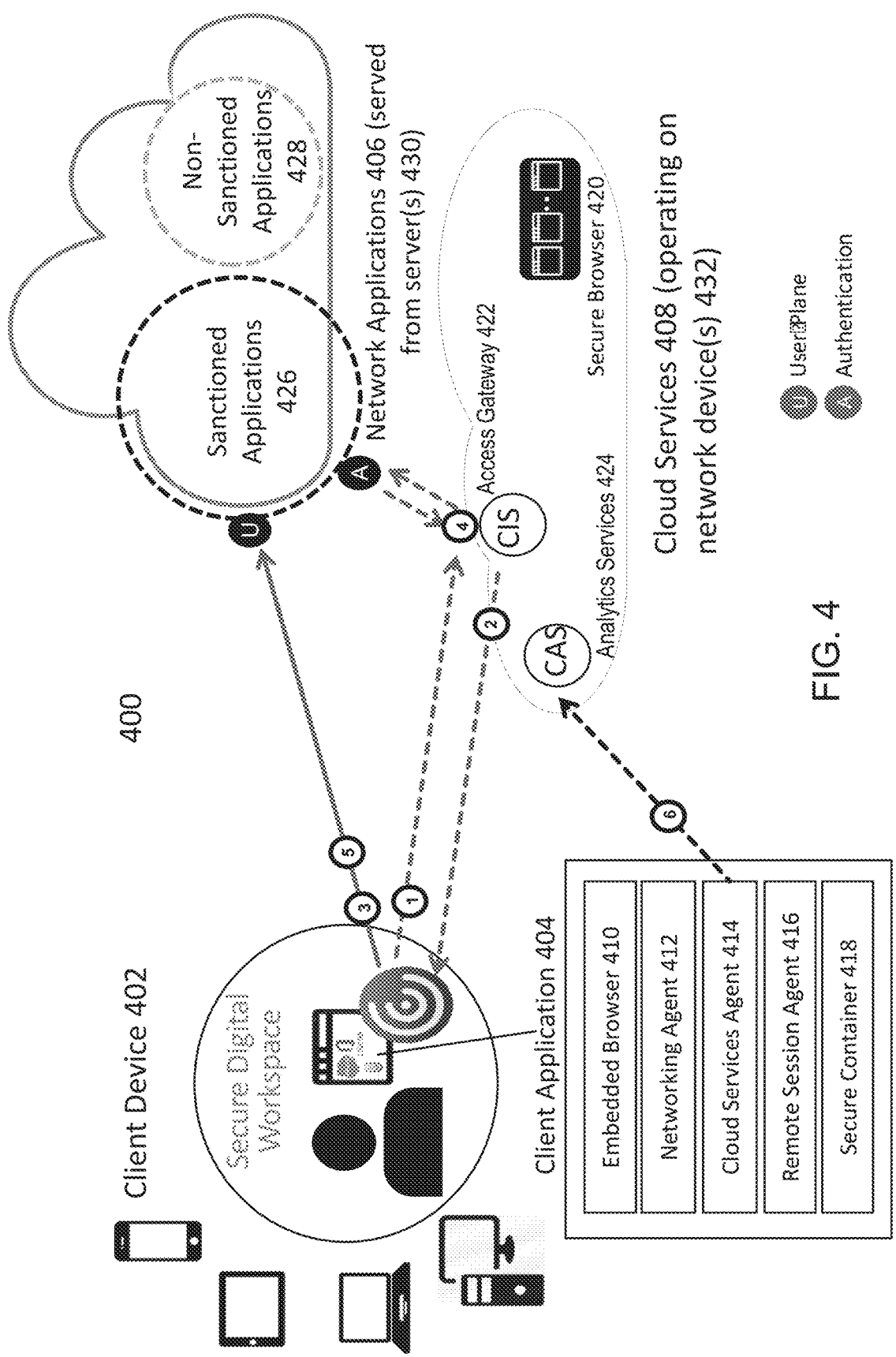
FIG. 4 is a block diagram of a system 400 of an embedded browser.

Referring now to FIG. 4, depicted is a block diagram of a system 400 of an embedded browser. In brief overview, the system 400 can include a client device 402 with a digital workspace for a user, a client application 404, cloud services 408 operating on at least one network device 432, and network applications 406 served from and/or hosted on one or more servers 430. The client application 404 can for instance include at least one of: an embedded browser 410, a networking agent 412, a cloud services agent 414, a remote session agent 416, or a secure container 418. The cloud services 408 can for instance include at least one of: secure browser(s) 420, an access gateway 422 (or CIS, e.g., for registering and/or authenticating the client application and/or user), or analytics services 424 (or CAS, e.g., for receiving information from the client application for analytics). The network applications 406 can include sanctioned applications 426 and non-sanctioned applications 428.

Each of the above-mentioned elements or entities is implemented in hardware, or a combination of hardware and software, in one or more embodiments. Each component of the system 400 can be implemented using hardware or a combination of hardware or software detailed above in connection with FIG. 1. For instance, each of these elements or entities can include any application, program, library, script, task, service, process or any type and form of executable instructions executing on hardware of the client device 402, the at least one network device 432 and/or the one or more servers 430. The hardware includes circuitry such as one or more processors in one or more embodiments. For example, the at least one network device 432 and/or the one or more servers 430 can include any of the elements of a computing device described above in connection with at least FIG. 1 for instance.

The client device 402 can include any embodiment of a computing device described above in connection with at least FIG. 1 for instance. The client device 402 can be any user device such as a desktop computer, a laptop computer, a tablet device, a smart phone, or any other mobile or personal device. The client device 402 can include a digital workspace of a user, which can include file system(s), cache or memory (e.g., including electronic clipboard(s)), container(s), application(s) and/or other resources on the client device 402. The digital workspace can include or extend to one or more networks accessible by the client device 402, such as an intranet and the Internet, including file system(s) and/or other resources accessible via the one or more networks. A portion of the digital workspace can be secured via the use of the client application 404 with embedded browser 410 (CEB) for instance. The secure portion of the digital workspace can include for instance file system(s), cache or memory (e.g., including electronic clipboard(s)), application(s), container(s) and/or other resources allocated to the CEB 410, and/or allocated by the CEB to network application(s) 406 accessed via the CEB. The secure portion of the digital workspace can also include resources specified by the CEB (via one or more policies) for inclusion in the secure portion of the digital workspace (e.g., a particular local application can be specified via a policy to be allowed to receive data obtained from a network application).

The client application 404 can include one or more components, such as an embedded browser 410, a networking agent 412, a cloud services agent 414 (sometimes referred to as management agent), a remote session agent 416 (sometimes referred to as HDX engine), and/or a secure container 418 (sometimes referred to as secure cache container). One or more of the components can be installed as part of a software build or release of the client application 404 or CEB, or separately acquired or downloaded and installed/integrated into an existing installation of the client application 404 or CEB for instance. For instance, the client device can download or otherwise receive the client application 404 (or any component) from the network device(s) 432. In some embodiments, the client device can send a request for the client application 404 to the network device(s) 432. For example, a user of the client device can initiate a request, download and/or installation of the client application. The network device(s) 432 in turn can send the client application to the client device. In some embodiments, the network device(s) 432 can send a setup or installation application for the client application to the client device. Upon receipt, the client device can install the client application onto a hard disk of the client device. In some embodiments, the client device can run the setup application to unpack or decompress a package of the client application. In some embodiments, the client application can be an extension (e.g., an add-on, an add-in, an applet or a plug-in) to another application (e.g., a cloud services agent 414) installed on the client device. The client device can install the client application to interface or inter-operate with the pre-installed application. In some embodiments, the client application can be a standalone application. The client device can install the client application to execute as a separate process.

The embedded browser 410 can include elements and functionalities of a web browser application or engine. The embedded browser 410 can locally render network application(s) as a component or extension of the client application. For instance, the embedded browser 410 can render a SaaS/Web application inside the CEB which can provide the CEB with full visibility and control of the application session. The embedded browser can be embedded or incorporated into the client application via any means, such as direct integration (e.g., programming language or script insertion) into the executable code of the client application, or via plugin installation. For example, the embedded browser can include a Chromium based browser engine or other type of browser engine, that can be embedded into the client application, using the Chromium embedded framework (CEF) for instance. The embedded browser can include a HTML5-based layout graphical user interface (GUI). The embedded browser can provide HTML rendering and JavaScript support to a client application incorporating various programming languages. For example, elements of the embedded browser can bind to a client application incorporating C, C++, Delphi, Go, Java, .NET/Mono, Visual Basic 6.0, and/or Python.

In some embodiments, the embedded browser comprises a plug-in installed on the client application. For example, the plug-in can include one or more components. One such component can be an ActiveX control or Java control or any other type and/or form of executable instructions capable of loading into and executing in the client application. For example, the client application can load and run an Active X control of the embedded browser, such as in a memory space or context of the client application. In some embodiments, the embedded browser can be installed as an extension on the client application, and a user can choose to enable or disable the plugin or extension. The embedded browser (e.g., via the plugin or extension) can form or operate as a secured browser for securing, using and/or accessing resources within the secured portion of the digital workspace.

The embedded browser can incorporate code and functionalities beyond that available or possible in a standard or typical browser. For instance, the embedded browser can bind with or be assigned with a secured container 418, to define at least part of the secured portion of a user's digital workspace. The embedded browser can bind with or be assigned with a portion of the client device's cache to form a secured clipboard (e.g., local to the client device, or extendable to other devices), that can be at least part of the secured container 418. The embedded browser can be integrated with the client application to ensure that traffic related to network applications is routed through and/or processed in the client application, which can provide the client application with real-time visibility to the traffic (e.g., when decrypted through the client application). This visibility to the traffic can allow the client application to perform or facilitate policy-based management (e.g., including data loss prevention (DLP) capabilities), application control, and collection and production of analytics.

In some embodiments, the embedded browser incorporates one or more other components of the client application 404, such as the cloud services agent 414, remote session agent 416 and/or secure container 418. For instance, a user can use the cloud services agent 414 of the embedded browser to interoperate with the access gateway 422 (sometimes referred to as CIS) to access a network application. For example, the cloud services agent 414 can execute within the embedded browser, and can receive and transmit navigation commands from the embedded browser to a hosted network application. The cloud services agent can use a remote presentation protocol to display the output generated by the network application to the embedded browser. For example, the cloud services agent 414 can include a HTML5 web client that allows end users to access remote desktops and/or applications on the embedded browser.

The client application 404 and CEB operate on the application layer of the operational (OSI) stack of the client device. The client application 404 can include and/or execute one or more agents that interoperate with the cloud services 408. The client application 404 can receive, obtain, retrieve or otherwise access various policies (e.g., an enterprise's custom, specified or internal policies or rules) and/or data (e.g., from an access gateway 422 and/or network device(s) of cloud services 408, or other server(s), that can be managed by the enterprise). The client application can access the policies and/or data to control and/or manage a network application (e.g., a SaaS, web or remote-hosted application). Control and/or management of a network application can include control and/or management of various aspects of the network application, such as access control, session delivery, available features or functions, service level, traffic management and monitoring, and so on. The network application can be from a provider or vendor of the enterprise (e.g., salesforce.com, SAP, Microsoft Office 365), from the enterprise itself, or from another entity (e.g., Dropbox or Gmail service).

For example, the cloud services agent 414 can provide policy driven management capabilities and features related to the use and/or access of network applications. For example, the cloud services agent 414 can include a policy engine to apply one or more policies (e.g., received from cloud services) to determine access control and/or connectivity to resources such as network applications. When a session is established between the client application and a server 430 providing a SaaS application for instance, the cloud services agent 414 can apply one or more policies to control traffic levels and/or traffic types (or other aspects) of the session, for instance to manage a service level of the SaaS application. Additional aspects of the application traffic that can be controlled or managed can include encryption level and/or encryption type applied to the traffic, level of interactivity allowed for a user, limited access to certain features of the network application (e.g., print-screen, save, edit or copy functions), restrictions to use or transfer of data obtained from the network application, limit concurrent access to two or more network applications, limit access to certain file repositories or other resources, and so on.

The cloud services agent 414 can convey or feed information to analytics services 424 of the cloud services 408, such as information about SaaS interaction events visible to the CEB. Such a configuration using the CEB can monitor or capture information for analytics without having an inline device or proxy located between the client device and the server(s) 430, or using a SaaS API gateway 'out-of-band' approach. In some embodiments, the cloud services agent 414 does not execute within the embedded browser. In these embodiments, a user can similarly use the cloud services agent 414 to interoperate with the access gateway (or CIS) 422 to access a network application. For instance, the cloud services agent 414 can register and/or authenticate with the access gateway (or CIS) 422, and can obtain a list of the network applications from the access gateway (or CIS) 422.

The cloud services agent 414 can include and/or operate as an application store (or storefront) for user selection and/or downloading of network applications. Upon logging in to access a network application, the cloud services agent 414 can intercept and transmit navigation commands from the embedded browser to the network application. The cloud services agent can use a remote presentation protocol to display the output generated by the network application to the embedded browser. For example, the cloud services agent 414 can include a HTML5 web client that allows end users to access remote desktops and/or applications on the embedded browser.

In some embodiments, the cloud services agent 414 provides single sign on (SSO) capability for the user and/or client device to access a plurality of network applications. The cloud services agent 414 can perform user authentication to access network applications as well as other network resources and services, by communicating with the access gateway 422 for instance. For example, the cloud services agent 414 can authenticate or register with the access gateway 422, to access other components of the cloud services 408 and/or the network applications 406. Responsive to the authentication or registration, the access gateway 422 can perform authentication and/or SSO for (or on behalf of) the user and/or client application, with the network applications.

The client application 404 can include a networking agent 412. The networking agent 412 is sometimes referred to as a software-defined wide area network (SD-WAN) agent, mVPN agent, or microVPN agent. The networking agent 412 can establish or facilitate establishment of a network connection between the client application and one or more resources (e.g., server 430 serving a network application). The networking agent 412 can perform handshaking for a requested connection from the client application to access a network application, and can establish the requested connection (e.g., secure or encrypted connection). The networking agent 412 can connect to enterprise resources (including services) for instance via a virtual private network (VPN). For example, the networking agent 412 can establish a secure socket layer (SSL) VPN between the client application and a server 430 providing the network application 406. The VPN connections, sometimes referred to as microVPN or application-specific VPN, can be specific to particular network applications, particular devices, particular secured areas on the client device, and the like, for instance as discussed above in connection with FIG. 3. Such VPN connections can carry Microsoft Exchange traffic, Microsoft Active Directory traffic, HyperText Transfer Protocol (HTTP) traffic, HyperText Transfer Protocol Secure (HTTPS) traffic, as some examples.

The remote session agent 416 (sometimes referred to as HDX engine) can include features of the client agent 304 discussed above in connection with FIG. 2 for instance, to support display a remoting protocol (e.g., HDX or ICA). In some embodiments, the remote session agent 416 can establish a remote desktop session and/or remote application session using any variety of protocols, such as the Remote Desktop Protocol (RDP), Appliance Link Protocol (ALP), Remote Frame Buffer (RFB) Protocol, and ICA Protocol. For example, the remote session agent 416 can establish a remote application session for a user of the client device to access an enterprise network application. The remote session agent 416 can establish the remote application session within or over a secure connection (e.g., a VPN) established by the networking agent 412 for instance.

The client application or CEB can include or be associated with a secure container 418. A secure container can include a logical or virtual delineation of one or more types of resources accessible within the client device and/or accessible by the client device. For example, the secure container 418 can refer to the entirety of the secured portion of the digital workspace, or particular aspect(s) of the secured portion. In some embodiments, the secure container 418 corresponds to a secure cache (e.g., electronic or virtual clipboard), and can dynamically incorporate a portion of a local cache of each client device of a user, and/or a cloud-based cache of the user, that is protected or secured (e.g., encrypted). The secure container can define a portion of file system(s), and/or delineate resources allocated to a CEB and/or to network applications accessed via the CEB. The secure container can include elements of the secure data container 228 discussed above in connection with FIG. 2 for example. The CEB can be configured (e.g., via policies) to limit, disallow or disable certain actions or activities on resources and/or data identified to be within a secure container. A secured container can be defined to specify that the resources and/or data within the secure container are to be monitored for misuse, abuse and/or exfiltration.

In certain embodiments, a secure container relates to or involves the use of a secure browser (e.g., embedded browser 410 or secure browser 420) that implements various enterprise security features. Network applications (or web pages accessed by the secure browser) that are configured to run within the secure browser can effectively inherit the security mechanisms implemented by the secure browser. These network applications can be considered to be contained within the secure container. The use of such a secure browser can enable an enterprise to implement a content filtering policy in which, for example, employees are blocked from accessing certain web sites from their client devices. The secure browser can be used, for example, to enable client device users to access a corporate intranet without the need for a VPN.

In some embodiments, a secure container can support various types of remedial actions for protecting enterprise resources. One such remedy is to lock the client device, or a secure container on the client device that stores data to be protected, such that the client device or secure container can only be unlocked with a valid code provided by an administrator for instance. In some embodiments, these and other types of remedies can be invoked automatically based on conditions detected on the client device (via the application of policies for instance), or can be remotely initiated by an administrator.

In some embodiments, a secure container can include a secure document container for documents. A document can comprise any computer-readable file including text, audio, video, and/or other types of information or media. A document can comprise any single one or combination of these media types. As explained herein, the secure container can help prevent the spread of enterprise information to different applications and components of the client device, as well as to other devices. The enterprise system (which can be partially or entirely within a cloud network) can transmit documents to various devices, which can be stored within the secure container. The secure container can prevent unauthorized applications and other components of the client device from accessing information within the secure container. For enterprises that allow users to use their own client devices for accessing, storing, and using enterprise data, providing secure container on the client devices helps to secure the enterprise data. For instance, providing secure containers on the client devices can centralize enterprise data in one location on each client device, and can facilitate selective or complete deletion of enterprise data from each client device when desired.

The secure container can include an application that implements a file system that stores documents and/or other types of files. The file system can comprise a portion of a computer-readable memory of the client device. The file system can be logically separated from other portions of the computer-readable memory of the client device. In this way, enterprise data can be stored in a secure container and private data can be stored in a separate portion of the computer-readable memory of the client device for instance. The secure container can allow the CEB, network applications accessed via the CEB, locally installed applications and/or other components of the client device to read from, write to, and/or delete information from the file system (if authorized to do so). Deleting data from the secure container can include deleting actual data stored in the secure container, deleting pointers to data stored in the secure container, deleting encryption keys used to decrypt data stored in the secure container, and the like. The secure container can be installed by, e.g., the client application, an administrator, or the client device manufacturer. The secure container can enable some or all of the enterprise data stored in the file system to be deleted without modifying private data stored on the client device outside of the secure container. The file system can facilitate selective or complete deletion of data from the file system. For example, an authorized component of the enterprise's system can delete data from the file system based on, e.g., encoded rules. In some embodiments, the client application can delete the data from the file system, in response to receiving a deletion command from the enterprise's system.

The secure container can include an access manager that governs access to the file system by applications and other components of the client device. Access to the file system can be governed based on document access policies (e.g., encoded rules) maintained by the client application, in the documents and/or in the file system. A document access policy can limit access to the file system based on (1) which application or other component of the client device is requesting access, (2) which documents are being requested, (3) time or date, (4) geographical position of the client device, (5) whether the requesting application or other component provides a correct certificate or credentials, (6) whether the user of the client device provides correct credentials, (7) other conditions, or any combination thereof. A user's credentials can comprise, for example, a password, one or more answers to security questions (e.g., What is the mascot of your high school?), biometric information (e.g., fingerprint scan, eye-scan), and the like. Hence, by using the access manager, the secure container can be configured to be accessed only by applications that are authorized to access the secure container. As one example, the access manager can enable enterprise applications installed on the client device to access data stored in the secure container and to prevent non-enterprise applications from accessing the data stored in the secure container.

Temporal and geographic restrictions on document access can be useful. For example, an administrator can deploy a document access policy that restricts the availability of the documents (stored within the secure container) to a specified time window and/or a geographic zone (e.g., as determined by a GPS chip) within which the client device must reside in order to access the documents. Further, the document access policy can instruct the secure container or client application to delete the documents from the secure container or otherwise make them unavailable when the specified time period expires or if the client device is taken outside of the defined geographic zone.

Some documents can have access policies that forbid the document from being saved within the secure container. In such embodiments, the document can be available for viewing on the client device only when the user is logged in or authenticated via the cloud services for example.

The access manager can also be configured to enforce certain modes of connectivity between remote devices (e.g., an enterprise resource or other enterprise server) and the secure container. For example, the access manager can require that documents received by the secure container from a remote device and/or sent from the secure container to the remote device be transmitted through secured tunnels/connections, for example. The access manager can require that all documents transmitted to and from the secure container be encrypted. The client application or access manager can be configured to encrypt documents sent from the secure container and decrypt documents sent to the secure container. Documents in the secure container can also be stored in an encrypted form.

The secure container can be configured to prevent documents or data included within documents or the secure container from being used by unauthorized applications or components of the client device or other devices. For instance, a client device application having authorization to access documents from the secure container can be programmed to prevent a user from copying a document's data and pasting it into another file or application interface, or locally saving the document or document data as a new file outside of the secure container. Similarly, the secure container can include a document viewer and/or editor that do not permit such copy/paste and local save operations. Moreover, the access manager can be configured to prevent such copy/paste and local save operations. Further, the secure container and applications programmed and authorized to access documents from the secure container can be configured to prevent users from attaching such documents to emails or other forms of communication.

One or more applications (e.g., applications installed on the client device, and/or network applications accessed via the CEB) can be programmed or controlled (e.g., via policy-based enforcement) to write enterprise-related data only into the secure container. For instance, an application's source code can be provided with the resource name of the secure container. Similarly, a remote application (e.g., executing on a device other than the client device) can be configured to send data or documents only to the secure container (as opposed to other components or memory locations of the client device). Storing data to the secure container can occur automatically, for example, under control of the application, the client application, and/or the secure browser. The client application can be programmed to encrypt or decrypt documents stored or to be stored within the secure container. In certain embodiments, the secure container can only be used by applications (on the client device or a remote device) that are programmed to identify and use the secure container, and which have authorization to do so.

The network applications 406 can include sanctioned network applications 426 and non-sanctioned network applications 428. By way of a non-limiting example, sanctioned network applications 426 can include network applications from Workday, Salesforce, Office 365, SAP, and so on, while non-sanctioned network applications 426 can include network applications from Dropbox, Gmail, and so on. For instance, FIG. 4 illustrates a case where sanctioned applications 426 are accessed via a CEB. In operation (1), a user instance of a client application 404, that is installed on client device 402, can register or authenticate with the access gateway 422 of cloud services 408. For example, the user can authenticate the user to the client device and login to the client device 402. The client application can automatically execute, or be activated by the user. In some embodiments, the user can sign in to the client application (e.g., by authenticating the user to the client application). In response to the login or sign-in, the client application can register or authenticate the user and/or the client application with the access gateway 422.

In operation (2), in response to the registration or authentication of the user, the access gateway 422 can identify or retrieve a list of enumerated network applications available or pre-assigned to the user, and can provide the list to the client application. For example, in response to the registration or authentication, the access gateway can identify the user and/or retrieve a user profile of the user. According to the identity and/or user profile, the access gateway can determine the list (e.g., retrieve a stored list of network applications matched with the user profile and/or the identity of the user). The list can correspond to network applications sanctioned for the user. The access gateway can send the list to the client application or embedded browser, which can be presented via the client application or embedded browser to the user (e.g., in a storefront user interface) for selection.

In operation (3), the user can initiate connection to a sanctioned network application (e.g., a SaaS application), by selecting from the list of network applications presented to the user. For example, the user can click on an icon or other representation of the sanctioned network application, displayed via the client application or embedded browser. This user action can trigger the CEB to transmit a connection or access request to a server that provisions the network application. The request can include a request to the server (e.g., SaaS provider) to communicate with the access gateway to authenticate the user. The server can send a request to the access gateway to authenticate the user for example.

In operation (4), the access gateway can perform SSO with the server, to authenticate the user. For example, in response to the server's request to authenticate the user, the access gateway can provide credentials of the user to the server(s) 430 for SSO, to access the selected network application and/or other sanctioned network applications. In operation (5), the user can log into the selected network application, based on the SSO (e.g., using the credentials). The client application (e.g., the networking agent 412 and/or the remote session agent 416) can establish a secure connection and session with the server(s) 430 to access the selected network application. The CEB can decrypt application traffic received via the secure connection. The CEB can monitor traffic sent via the CEB and the secured connection to the servers 430.

In operation (6), the client application can provide information to the analytics services 424 of cloud services 408, for analytics processing. For example, the cloud services agent 414 of the client application 404 can monitor for or capture user interaction events with the selected network application. The cloud services agent 414 can convey the user interaction events to the analytics services 424, to be processed to produce analytics.

Figure 5:
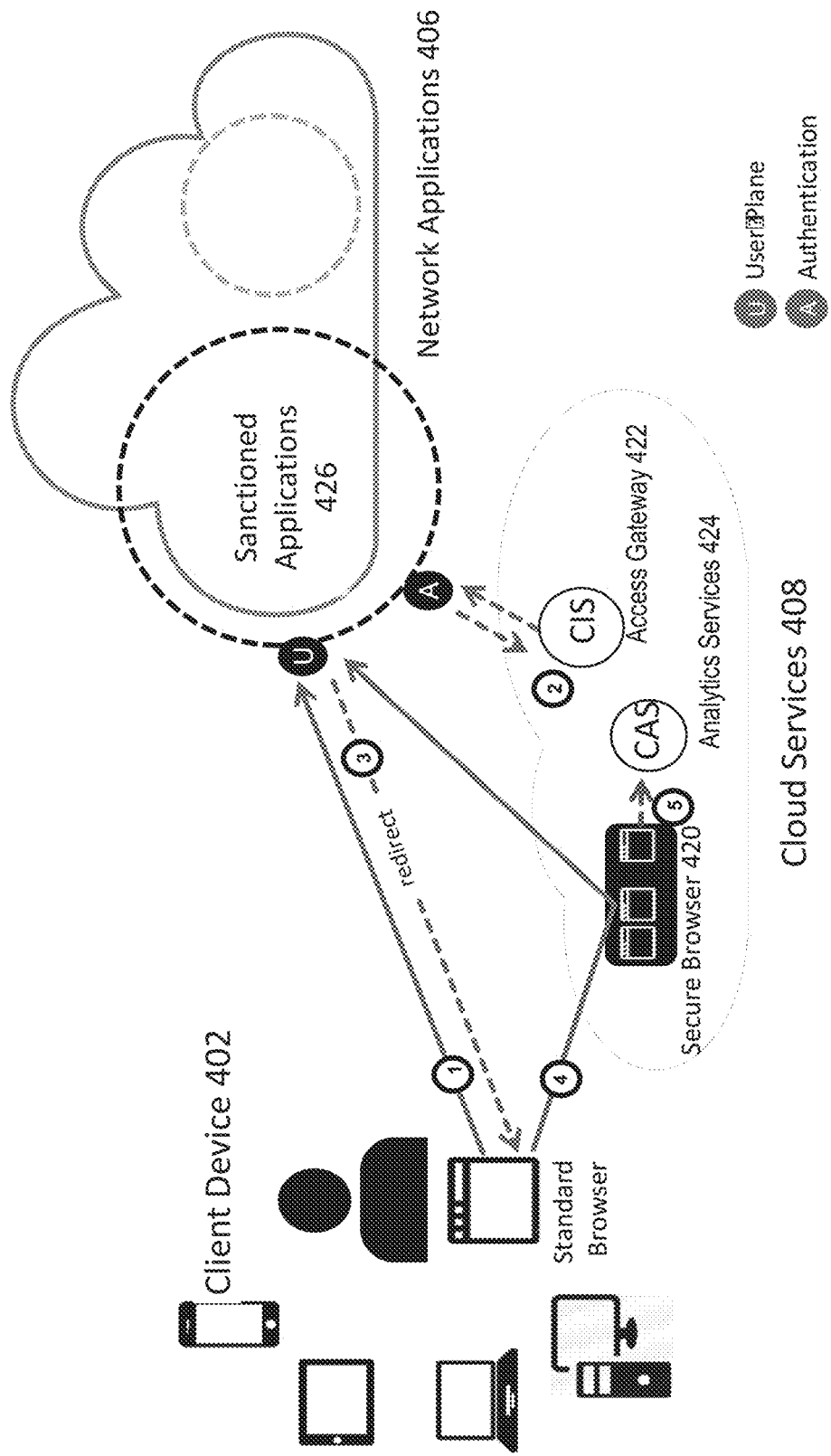
FIG. 5 is a block diagram of an example embodiment of a system for using a secure browser.

FIG. 5 depicts an example embodiment of a system for using a secure browser. In brief overview, the system includes cloud services 408, network applications 406 and client device 402. In some embodiments, various elements of the system are similar to that described above for FIG. 4, but that the client application (with embedded browser) is not available in the client device 402. A non-embedded application browser can be available on the client device, from which a user can initiate a request to access a sanctioned network application for instance. A network application can be specified as being sanctioned or unsanctioned via policies that can be set by an administrator or automatically (e.g., via artificial intelligence).

For example, in operation (1), the user can log into the network application using the standard browser. For accessing a sanctioned network application, the user can access a predefined URL and/or corresponding webpage of a server that provisions the network application, via the standard browser, to initiate a request to access the network application. In some embodiments, the request can be forwarded to or intercepted by a designated gateway service (e.g., in a data path of the request). For example, the gateway service can reside on the client device (e.g., as an executable program), or can reside on a network device 432 of the cloud services 408 for instance. In some embodiments, the access gateway can correspond to or include the gateway service. The gateway service can determine if the requested network application is a sanctioned network application. The gateway service can determine if a CEB initiated the request. The gateway service can detect or otherwise determine that the request is initiated from a source (e.g., initiated by the standard browser) in the client device other than a CEB. In some embodiments, there is no requirement for a designated gateway service to detect or determine if the request is initiated from a CEB, for example if the requested network application is sanctioned, that user is initiating the request via a standard browser, and/or that the predefined URL and/or corresponding webpage is accessed.

In operation (2), the server can authenticate the user via the access gateway of the cloud services 408. The server can communicate with the access gateway to authenticate the user, in response to the request. For instance, the request can include an indication to the server to communicate with the access gateway to authenticate the user. In some embodiments, the server is pre-configured to communicate with the access gateway to authenticate the user, for requests to access a sanctioned network application. The server can send a request to the access gateway to authenticate the user. In response to the server's request to authenticate the user, the access gateway can provide credentials of the user to the server 430.

In operation (3), the gateway service and/or the server can direct (or redirect) all traffic to a secure browser 420 which provides a secure browsing service. This can be in response to at least one of: a determination that the requested network application is a sanctioned network application, a determination that the request is initiated from a source other than a CEB, a determination that the requested network application is sanctioned, a determination that user is initiating the request via a standard browser, and/or a determination that the predefined URL and/or corresponding webpage is accessed.

The user's URL session can be redirected to the secure browser. For example, the server, gateway service and/or the access gateway can generate and/or send a URL redirect message to the standard browser, responsive to the determination. The secure browser plug-in of the standard browser can receive the URL redirect message, and can for example send a request to access the non-sanctioned network application, to the secure browser 420. The secure browser 420 can direct the request to the server of the non-sanctioned network application. The URL redirect message can instruct the standard browser (and/or the secure browser plug-in) to direct traffic (e.g., destined for the network application) from the standard browser to the secure browser 420 hosted on a network device. This can provide clientless access and control via dynamic routing though a secure browser service. In some embodiments, a redirection of all traffic to the secure browser 420 is initiated or configured, prior to performing authentication of the user (e.g., using SSO) with the server.

In some embodiments, the gateway service can direct or request the server of the requested network application to communicate with the secure browser 420. For example, the gateway service can direct the server and/or the secure browser to establish a secured connection between the server and the secure browser, for establishing an application session for the network application.

In some embodiments, the secured browser 420 comprises a browser that is hosted on a network device 432 of the cloud services 408. The secured browser 420 can include one or more features of the secured browser 420 described above in connection with at least FIG. 4 for instance. The hosted browser can include an embedded browser of a CEB that is hosted on the network device 432 instead of on the client device. The hosted browser can include an embedded browser of a hosted virtualized version of the CEB that is hosted on the network device 432. Similar to the CEB installed on the client device, traffic is routed through the CEB hosted on the network device, which allows an administrator to have visibility of the traffic through the CEB and to remain in control for security policy control, analytics, and/or management of performance.

Figure 6:
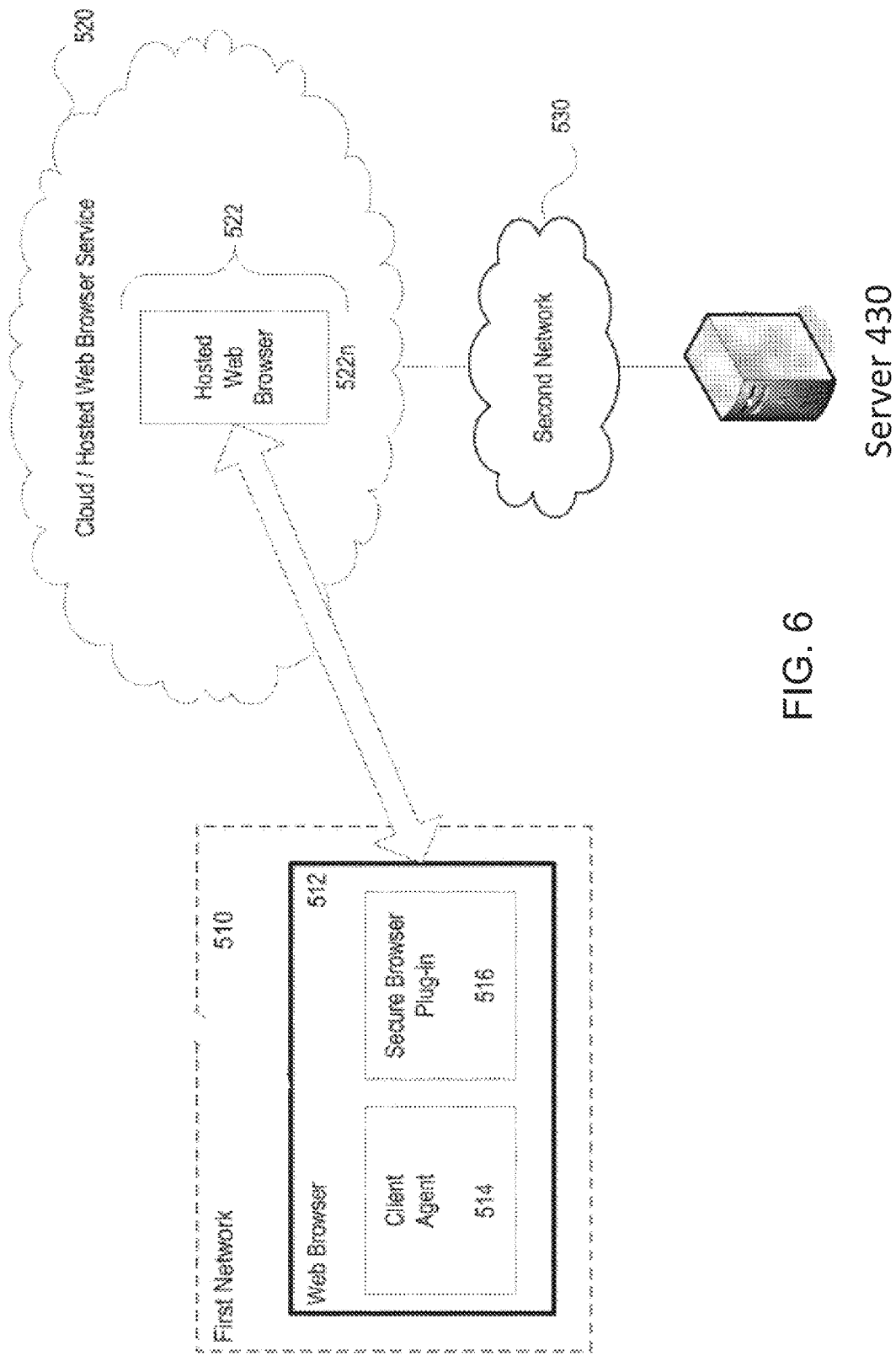

FIG. 6 illustrates an example implementation for browser redirection using a secure browser plug-in. In brief overview, the implementation includes a web browser 512 with a secure browser plug-in 516 operating on a client device, and a hosted web browser (or secure browser) 522 residing on a network device. The web browser 512 can correspond to a standard browser, instead of an embedded browser as discussed above in connection with FIG. 4 for example. The secure browser plug-in 516 can execute within a first network 510 and access a server 430 in a second network 530. The first network 510 and the second network 530 are for illustration purposes and can be replaced with fewer or additional computer networks. A secure browser plug-in 516 can be installed on the standard browser 512. The plug-in can include one or more components. One such component can include an ActiveX control or Java control or any other type and/or form of executable instructions capable of loading into and executing in the standard browser. For example, the standard browser can load and run an Active X control of the secure browser plug-in 516, in a memory space or context of the standard browser. In some embodiments, the secure browser plug-in can be installed as an extension on the standard browser, and a user can choose to enable or disable the plugin or extension. The secure browser plug-in can communicate and/or operate with the secured browser 420 for securing, using and/or accessing resources within the secured portion of the digital workspace.

By using the secure browser plug-in 516 operating within the standard browser 512 network applications accessed via the standard browser 512 can be redirected to a hosted secure browser. For instance, the secure browser plug-in 516 can be implemented and/or designed to detect that a network application is being accessed via the standard browser, and can direct/redirect traffic from the client device associated with the network application, to the hosted secure browser. The hosted secure browser can direct traffic received from the network application, to the secure browser plug-in 516 and/or a client agent 514 for rendering and/or display for example. The client agent 514 can execute within the web browser 512 and/or the secure browser plug-in, and can include certain elements or features of the client application 404 discussed above in connection with at least FIG. 4 for example. For instance, the client agent 514 can include a remote session agent 416 for rendering the network application at the web browser 512. In some embodiments, the network application is rendered at the hosted secure browser, and the rendered data is conveyed or mirrored to the secure browser plug-in 516 and/or the client agent 514 for processing and/or display.

By way of an example, a user can be working remotely and can want to access a network application that is internal to a secure corporate network while the user is working on a computing device connected to an unsecure network. In this case, the user can be utilizing the standard browser 512 executing in the first network 510, in which the first network 510 can comprise an unsecure network. The server 430 that the user wants to access can be on the second network 530, in which the second network 530 comprises a secure corporate network for instance. The user might not be able to access the server 430 from the unsecure first network 510 by clicking on an internal uniform record locator (URL) for the secure website 532. That is, the user may need to utilize a different URL (e.g., an external URL) while executing the standard browser 512 from the external unsecure network 510. The external URL can be directed to or can address one or more hosted web browsers 522 configured to access server(s) 430 within the second network 530 (e.g., secure network). To maintain secure access, the secure browser plug-in 516 can redirect an internal URL to an external URL for a hosted secure browser.

The secure browser plug-in 516 can implement network detection in order to identify whether or not to redirect internal URLs to external URLs. The standard browser 512 can receive a request comprising an internal URL for a website executing within the secure network. For example, the standard browser 512 can receive the request in response to a user entering a web address (e.g., for secure website 532) in the standard browser. The secure browser plug-in 516 can redirect the user web browser application 512 from the internal URL to an external URL for a hosted web browser application. For example, the secure browser plug-in 516 can replace the internal URL with an external URL for the hosted web browser application 522 executing within the secure network 530.

The secure browser plug-in 516 can allow the client agent 514 to be connected to the hosted web browser application 522. The client agent 514 can comprise a plug-in component, such as an ActiveX control or Java control or any other type and/or form of executable instructions capable of loading into and executing in the standard browser 512. For example, the client agent 514 can comprise an ActiveX control loaded and run by a standard browser 512, such as in the memory space or context of the user web browser application 512. The client agent 514 can be pre-configured, in some examples, to present the content of the hosted web browser application 522 within the user web browser application 512.

The client agent 514 can connect to a server or the cloud/hosted web browser service 520 using a thin-client or remote-display protocol to present display output generated by the hosted web browser application 522 executing on the service 520. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

The hosted web browser application 522 can navigate to the requested network application in full-screen mode, and can render the requested network application. The client agent 514 can present the content or rendition of the network application on the web browser application 512 in a seamless and transparent manner such that it appears that the content is being displayed by the standard browser 512, e.g., based on the content being displayed in full screen mode. In other words, the user can be given the impression that the website content is displayed by the user web browser application 512 and not by the hosted web browser application 522. The client agent 514 can transmit navigation commands generated by the user web browser application 512 to the hosted web browser application 522 using the thin-client or remote-display protocol. Changes to the display output of the hosted web browser application 522, due to the navigation commands, can be reflected in the user web browser application 512 by the client agent 514, giving the impression to the user that the navigation commands were executed by the user web browser application 512.

Referring again to FIG. 5, and in operation (4), a new browser tab can open on the standard browser, to render or display the secure browser session. The new browser tab can be established or opened by the secure browser plug-in for instance. The secure browser plug-in and/or a client agent can receive data from the secure browser session, and can render the network application within the new browser tab as discussed above in connection with FIG. 6 for instance.

In operation (5), the secure browser can feed all user interaction events via the network application, back to analytics service for processing. The secure browser plug-in can monitor for and intercept any user interaction events directed to the rendition of the network application within the browser tab. Hence, a user can use a native (or standard) browser to access a network application while allowing visibility into the network application's traffic, via the interoperation of cloud services and a secure browser (in the absence of the client application).

Figure 7:
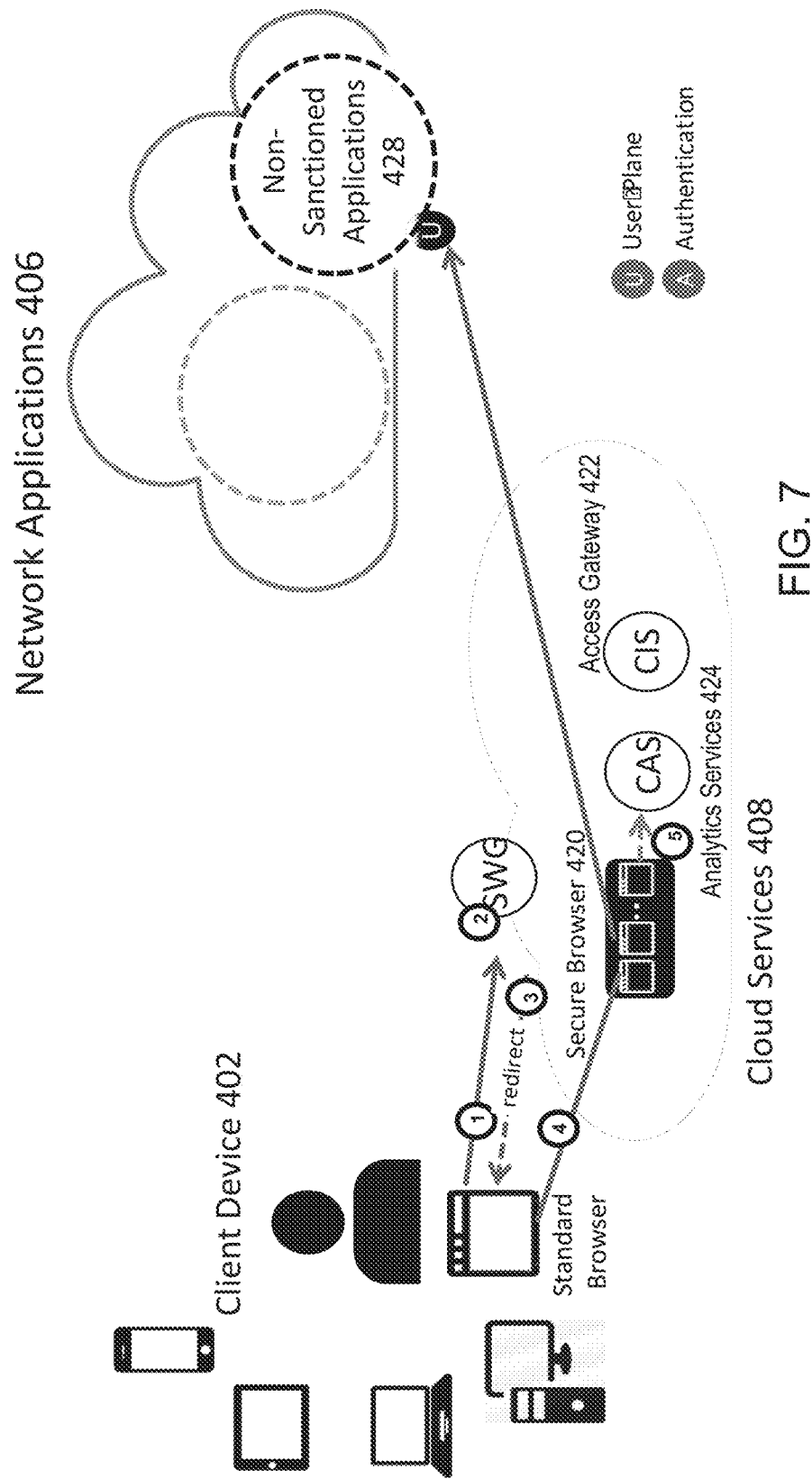
FIG. 7 is a block diagram of example embodiment of a system of using a secure browser.

FIG. 7 depicts another example embodiment of a system of using a secure browser. In brief overview, the system includes cloud services 408, network applications 406 and the client device 402. In some embodiments, various elements of the system are similar to that described above for FIG. 5. A client application with embedded browser is not available in the client device 402. A standard or typical (e.g., HTML5) browser is available on the client device, from which a user can initiate a request to access a non-sanctioned network application. A network application can be specified as being sanctioned or non-sanctioned via policies that can be set by an administrator or automatically (e.g., via artificial intelligence).

In operation (1), the user can attempt to log into a non-sanctioned network application using the standard browser. The user can attempt to access a webpage of a server that provisions the network application, and to initiate a request to access the network application. In some embodiments, the request can be forwarded to or intercepted by a designated gateway service (e.g., in a data path of the request). For example, the gateway service (sometimes referred to as SWG) can reside on the client device (e.g., as an executable program), or can reside on a network device 432 of the cloud services 408 for instance. The gateway service can detect or otherwise determine if the requested network application is a sanctioned network application. The gateway service can determine if a CEB initiated the request. The gateway service can detect or otherwise determine that the request is initiated from a source (e.g., initiated by the standard browser) in the client device other than a CEB.

In operation (2), the gateway service detects that the requested network application is a non-sanctioned network application. The gateway service can for instance extract information from the request (e.g., destination address, name of the requested network application), and compare the information against that from a database of sanctioned and/or non-sanctioned network applications. The gateway service can determine, based on the comparison, that the requested network application is a non-sanctioned network application.

In operation (3), responsive to the determination, the gateway service can block access to the requested network application, e.g., by blocking the request. The gateway service can generate and/or send a URL redirect message to the standard browser, responsive to the determination. The URL redirect message can be similar to a URL redirect message sent from the server to the standard browser in FIG. 5 in operation (3). A secure browser plug-in of the standard browser can receive the URL redirect message, and can for example send a request to access the non-sanctioned network application, to the secure browser 420. The secure browser 420 can direct the request to the server of the non-sanctioned network application.

The server of the non-sanctioned network application can authenticate the user via the access gateway of the cloud services 408, e.g., responsive to receiving the request from the secure browser. The server can communicate with the access gateway to authenticate the user, in response to the request. The server can send a request to the access gateway to authenticate the user. In response to the server's request to authenticate the user, the access gateway can provide credentials of the user to the server 430. Upon authentication, the secure browser (or a corresponding CEB) can establish a secured connection and an application session with the server.

In operation (4), a new browser tab can open on the standard browser, to render or display the secure browser's application session. The new browser tab can be established or opened by the secure browser plug-in for instance. The secure browser plug-in and/or a client agent can receive data from the secure browser session, and can render the network application within the new browser tab as discussed above in connection with FIGS. 5-6 for instance.

In operation (5), the secure browser can feed all user interaction events via the network application, back to analytics service for processing. The secure browser plug-in can monitor for and intercept any user interaction events directed to the rendition of the network application within the browser tab. Hence, a user can use a native (or standard) browser to access a network application while allowing visibility into the network application's traffic, via the interoperation of cloud services and a secure browser (in the absence of the client application).

In some embodiments, in the absence or non-availability of a CEB on the client device, browser redirection is performed so that each requested network application is accessed via a corresponding hosted secure browser (or hosted CEB) for handling, instead of having all traffic redirected through a single hosted secure browser (or hosted CEB). Each dedicated secure browser can provide compartmentalization and improved security.

The use of a CEB, whether hosted or local to the client device, can allow for end-to-end visibility of application traffic for analytics, service level agreement (SLA), resource utilization, audit, and so on. In addition to such visibility, the CEB can be configured with policies for managing and controlling any of these as well as other aspects. For example, DLP features can be supported, to control "copy and paste" activities, download of files, sharing of files, and to implement watermarking for instance. As another example, the CEB can be configured with policies for managing and controlling access to local drives and/or device resources such as peripherals.

Figure 8:
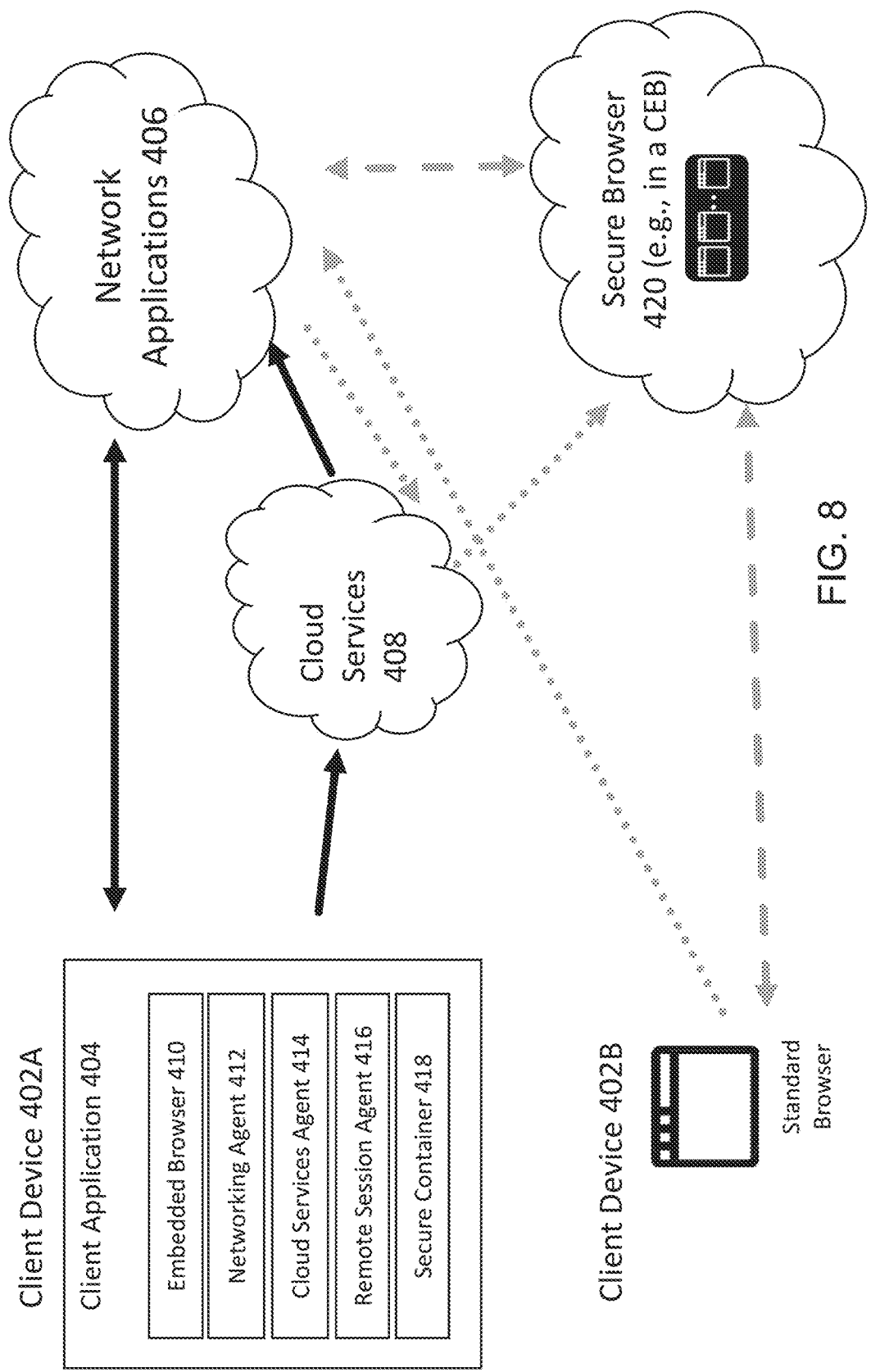
FIG. 8 is a block diagram of an example embodiment of a system for using local embedded browser(s) and hosted secured browser(s)

Referring now to FIG. 8, an example embodiment of a system for using local embedded browser(s) and hosted secured browser(s) is depicted. An environment is shown where different types of client devices 402A, 402B can be used (e.g., in a BYOD context), such that one can be locally equipped with a suitable CEB, and another client device may not have a suitable local CEB installed. In such an environment, systems described in FIGS. 4, 5 and 7 can be used to support each of the client devices based on the availability of a locally installed and suitable CEB.

Figure 9:
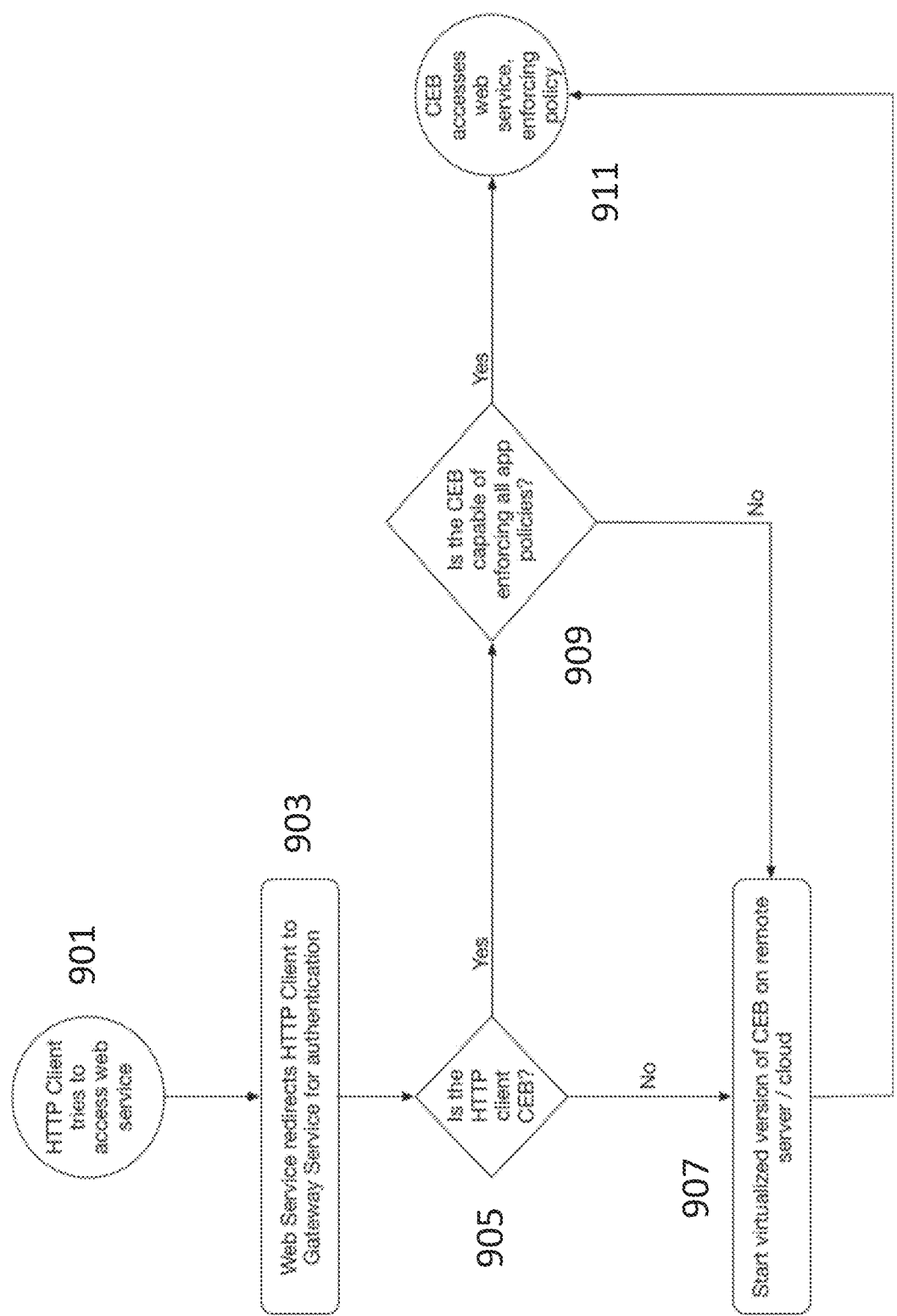
FIG. 9 is an example process flow for using local embedded browser(s) and hosted secured browser(s)

FIG. 9 depicts an example process flow for using local embedded browser(s) and hosted secured browser(s). The process flow can be used in the environment described above in FIG. 8, to determine whether an embedded browser or a hosted secured browser should be used for each client device to access a network application. For example, in operation 901, a HTTP client can attempt to access a web service (e.g., server of a network application). In operation 903, the web service can redirect the HTTP client to a gateway service for authentication. In operation 905, the gateway service can determine if the HTTP client is a CEB. If so, in operation 909, the gateway service can determine if the CEB is a suitable CEB, e.g., capable of enforcing defined application policies. If so, in operation 911, the CEB is allowed access to the web service, and can enforce the defined policies.

If the gateway service determines that the HTTP client is not a CEB, the gateway service can cause a virtualized version of a CEB to be initialized and hosted on a remote server (e.g., a network device 432 of cloud services 408), in operation 907. In some embodiments, such a hosted CEB can already be available on a network device 432, and can be selected for use. For example in operation 911, the CEB is allowed access to the web service, and can enforce the defined policies.

If the gateway service determines that the HTTP client is a CEB, but that the CEB is not a suitable CEB, the gateway service can cause a virtualized version of a CEB to be initialized and hosted on a remote server (e.g., a network device 432 of cloud services 408), in operation 907. In some embodiments, such a hosted CEB can already be available on a network device 432, and can be selected for use. For example in operation 911, the CEB is allowed access to the web service, and can enforce the defined policies.

In some embodiments, if the user is requesting access to a web application located in a company data center, the gateway service (in cloud service or on premise) can allow access when the client application with CEB is detected. Otherwise, the request can be routed to a service with the hosted virtualized version of the CEB, and then access is authenticated and granted.

At operation 905 and/or operation 909 for instance, the decisions made on whether the HTTP client is a CEB and whether it is a suitable CEB can be determined by a number of factors. For example, to determine if the HTTP client is CEB, the gateway service can take into account factors, for example including at least one of: user Identity and strength of authentication, client Location, client IP Address, how trusted the user identity, client location, client IP are, jailbreak status of the client device, status of anti-malware software, compliance to corporate policy of the client device, and/or remote attestation or other evidence of integrity of the client software.

To determine if the CEB is able to honor or support all defined application policies (which can vary by client version, client OS platform and other factors), the client device's software and gateway service can perform capability negotiation and/or exchange version information. In some embodiments, the gateway service can query or check a version number or identifier of the CEB to determine if the CEB is a suitable CEB to use.

Driving all the traffic though the CEB then allows additional control of content accessing SaaS and Web based systems. Data Loss Prevention (DLP) of SaaS and Web traffic can be applied through the CEB app with features including copy and paste control to other CEB access applications or IT managed devices. DLP can also be enforced by enabling content to be downloaded only to designated file servers or services under IT control.

Figure 10:
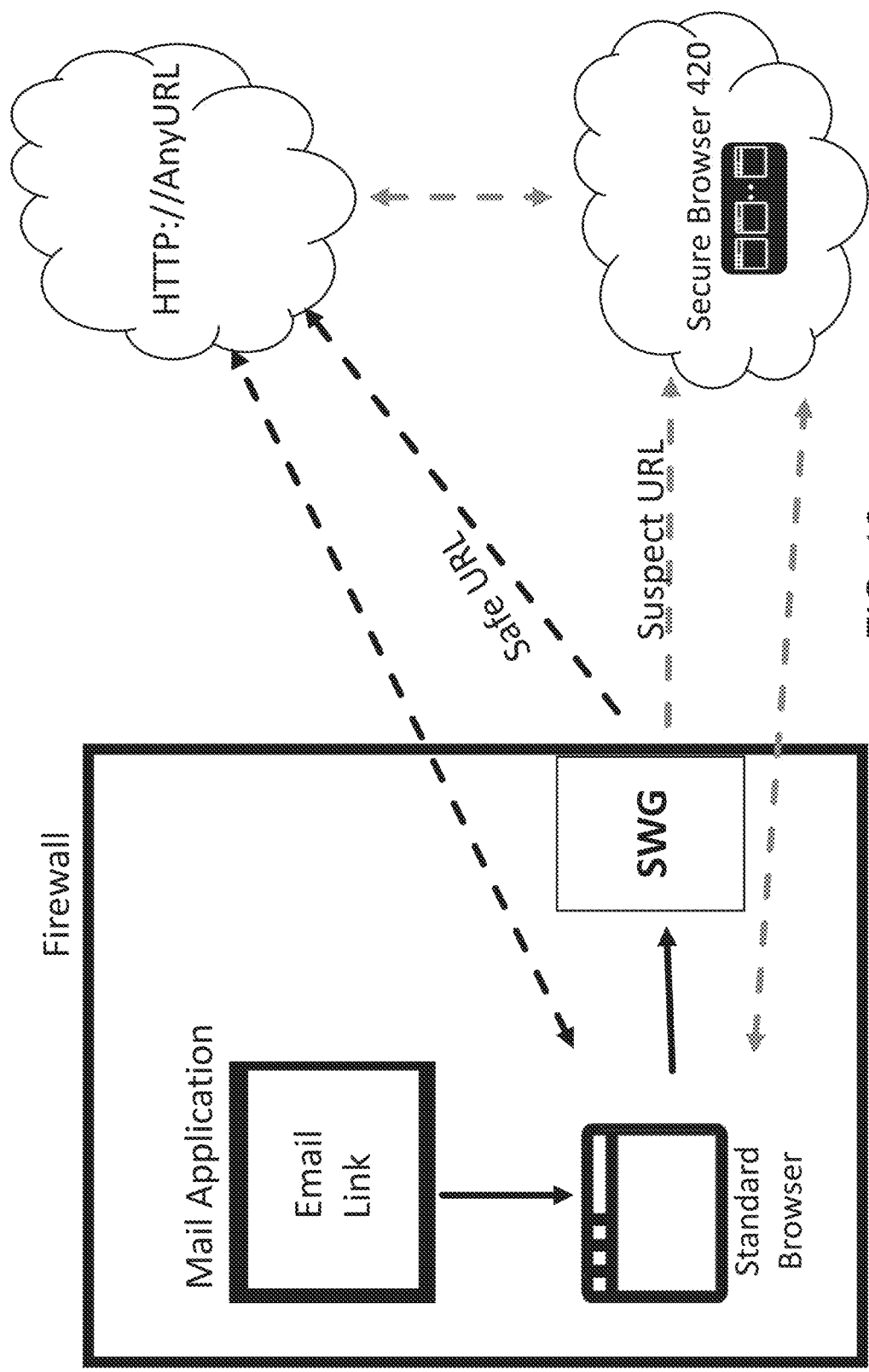
FIG. 10 is an example embodiment of a system for managing user access to webpages.

Referring now to FIG. 10, depicted is an example embodiment of a system for managing user access to webpages. Some webpages (or websites) are known to be safe while others can be suspect. A user can access a webpage via a corresponding URL through a standard browser. For example, the user can click on a link corresponding to the URL, which can be included in an email being viewed using a mail application. An access gateway (SWG) can intercept an access request generated by the clicking of the link, and can determine if the corresponding URL is safe or suspect. If the URL is known to be safe, the access gateway can allow the request to proceed to the corresponding website or web server. If the URL is suspect, the access gateway can redirect the request to be handled via a hosted secure browser. The secure browser can request access for, and access the webpage (on behalf of the standard browser), and can allow the webpage information to be conveyed to the standard browser, similar to the handling of a network application via browser redirection as discussed in connection with at least FIGS. 5 and 7.

C. Systems and Methods for a State Sharing Plug-In for the Embedded Browser

Systems and methods for providing a state-sharing plug-in in a computing workspace environment are provided. This technical solution can provide a state sharing plug-in for CEB that can detect a state of an application provided via the embedded browser, identify a local messaging application installed on the client device, and communicate, via a single sign-on protocol, an indication to a server that hosts the messaging application to control a state of the messaging application.

For example, users of the workspace can collaborate and keep being productive while engaging with other users via collaboration tools, such as instant messaging tools, direct messaging tools, group messaging tools, etc. While these tools allow the user to conveniently exchange messages with other users, the computing workspace may not be able to detect and update a current status of the user, such as idle or busy. Thus, it can be challenging or not possible for the messaging application to automatically detect the current state and update the state accordingly, which can result in unnecessary or wasted electronic messages being exchange amongst client devices, thereby resulting in wasted computing resource utilization or network bandwidth utilization. Furthermore, providing messages irrespective of the current state of the user may introduce delays or latencies in associated with network applications being utilized by the user, as well as degrade the user interface or computing user experience.

Systems and methods of this technical solution provide state sharing plug-in for the CEB that can determine a current state associated with the CEB or network application. This technical solution can allow the user to customize or set their state, or the plug-in can automatically detect the state via a client agent or engine. Upon determining the state, this technical solution can leverage a single sign-on protocol to access a remote server hosting the electronic messaging application and control the state of the electronic messaging application.

For example, when a user logs into the computing workspace, the user can access a network application. The state sharing plug-in can detect that the user accessed the network application. Responsive to detecting the user accessed the network application, the state sharing plug-in can synchronize the state of the local social application (e.g., messaging application) to block, prevent, or reduce delivery of electronic messages to the computing workspace of the user.

Figure 11:
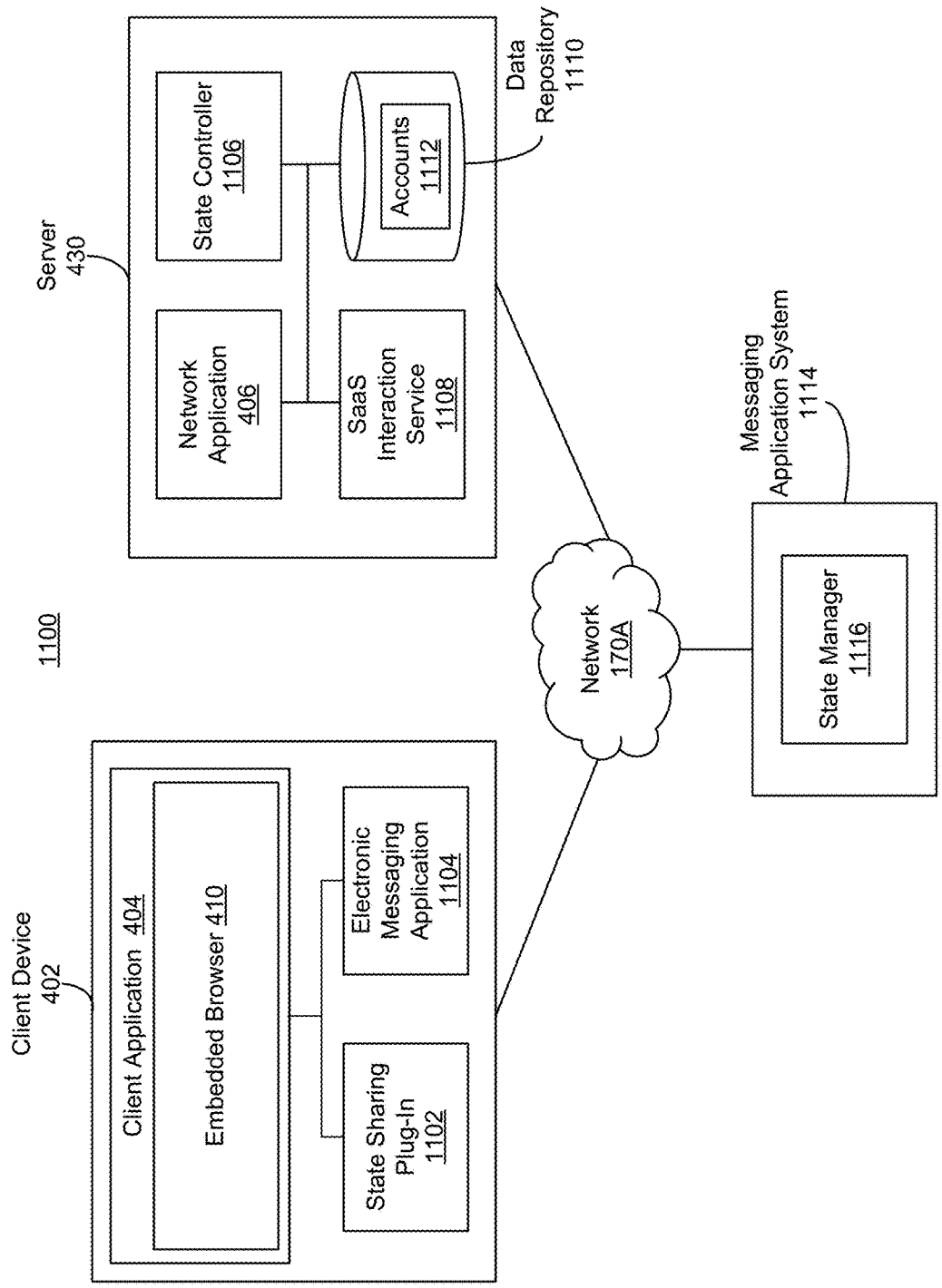
FIG. 11 is a block diagram of a system for a state sharing plug-in, in accordance with an implementation.

Referring to FIG. 11, depicted is a block diagram of a system for a state sharing plug-in, in accordance with an implementation. The system 1100 can include a client device 402 in communication with a server 430 via network 170A. The server 430 can communicate with the messaging application server 1114 via network 170A. The client device 402 can communicate with the messaging application server 1114 via network 170A. The client device 402 can include one or more component or functionality of client device 402 depicted in FIG. 4. For example, the client device 402 can include or provide a client application 404 that provides an embedded browser 410. The embedded browser can provide one or more network applications hosted or provided by the server 430. The client device 402 can include a state sharing plug-in 1102 to detect a launch of network application, and cause a messaging application system 1114 to control a state of an electronic messaging application 1104 installed or executing on the client device 402. The server 430 can include one or more component or functionality of server 430 depicted in FIG. 4. For example, the server 430 can include, execute, host, or otherwise provide a network application 406. The server 430 can include at least one state controller 1106 to control a state of an electronic messaging application. The server 430 can include at least one SaaS interaction service 1108 to use a single sign-on protocol to communicate with a messaging application system 1114. The system 1100 can include, interface or otherwise communicate with a messaging application system 1114. The messaging application system 1114 can include a state manager 1116 to control, update, or otherwise manage or maintain a state of an electronic messaging application 1104. The state can be associated with a particular client device 402 or account or user thereof.

The state sharing plug-in 1102, state controller 1106, SaaS interaction service 1108, or state manager 1116 can each include at least one processing unit or other logic device such as programmable logic array engine, or module configured to communicate with one or more other system or component depicted in FIG. 1. The state controller 1106 and SaaS interaction service 1108 can be separate components, a single component, or part of the server 430. In some cases, the state controller 1106 and SaaS interaction service 1108 can be part of the client device 402. The system 100 and its components can include hardware elements, such as one or more processors, logic devices, or circuits.

The client device 402, server 430, or messaging application system 1114 can include or be implemented using hardware or a combination of software and hardware. For example, components of the client device 402, server 430, or messaging application system 1114 can include logical circuitry (e.g., a central processing unit or CPU) that responses to and processes instructions fetched from a memory unit. Components of the client device 402, server 430, or messaging application system 1114 can include or use a microprocessor or a multi-core processor. A multi-core processor can include two or more processing units on a single computing component. Components of the client device 402, server 430, or messaging application system 1114 can be based on any of these processors, or any other processor capable of operating as described herein. Processors can utilize instruction level parallelism, thread level parallelism, different levels of cache, etc. For example, the client device 402, server 430, or messaging application system 1114 can include at least one logic device such as a computing device or server having at least one processor 105. The components and elements of the client device 402, server 430, or messaging application system 1114 can be separate components or a single component. The client device 402, server 430, or messaging application system 1114 can include a memory component, a random access memory (RAM) or other dynamic storage device, a storage device for storing information, and instructions to be executed. The memory can include at least one read only memory (ROM) or other static storage device coupled with the storage device for storing static information and instructions for the device 202. The memory can include a storage device, such as a solid state device, magnetic disk or optical disk, to persistently store information and instructions.

Still referring to FIG. 11, and in further detail, the system 1100 can include a client device 402. The client device 402 can include a client application 404, such as a web browser. The client application 404 can include, render, or provide an embedded browser 410. The client application 404 can include or provide a network agent 412, cloud services agent 414, remote session agent 416, or secure container 418, as depicted in FIG. 4. The client device 402 can include a state sharing plug-in 1102 designed, constructed and operational to detect a launch of a network application 406 via the embedded browser 410. The state sharing plug-in 1102 can detect the launch of the network application 406 responsive to input from a user interface, such as a keyboard, mouse, hotkey command, touch input, voice input, or other input. For example, the user of the client device 402 can launch the network application 406 via the embedded browser 410.

The state sharing plug-in 1102 can refer to or include a software component that provides functionality or features to the client application 404 or the embedded browser 410. The state sharing plug-in can support or plug-in to the embedded browser 410 or the client application 404. The state sharing plug-in 1102 can extend or add functionality to the embedded browser 410 or the client application 404. The state sharing plug-in 1102 can include a different source code or application package relative to the client application 404 or the embedded browser 410. The user of the client device 402 can enable or disable the state sharing plug-in 1102. For example, the user of the client device 402 can download and install the plug-in 1102, or otherwise configure the plug-in 1102 to allow the plug-in 1102 to perform one or more functionality of this technical solution.

The state sharing plug-in 1102 can register with a host application (e.g., the client application 404 or the embedded browser 410). The state sharing plug-in 1102 can include an interface configured to communicate or exchange data with the host application. The state sharing plug-in 1102 can utilize a communication protocol designed, constructed and operational to communicate with the host application in order to receive, transmit or otherwise exchange data with the host application. In some cases, the host application (e.g., the client application 404 or embedded browser 410) can function independently of the state sharing plug-in 1102. For example, the state sharing plug-in 1102 can be configured to not interference with operations or functionality of the client application 404 or embedded browser 410. The state sharing plug-in 1102 can be configured to not interface or disrupt a network application 406 launched via the embedded browser 410 and executing on the server 430. By not interfering with the host application, the plug-in 1102 can be dynamically updated or modified without making changes to the host application.

The state sharing plug-in 1102 can utilize a library that the client device 402 can load at run time. The library can be shared library that can be dynamically loaded at run time. The library can be retrieved from memory of the client device 402, or downloaded from server 430 at run time. The host application can load or install the library at a predetermined place or location.

Thus, the state sharing plug-in 1102 can detect the launch of the network application 406 via the embedded browser 410. The state sharing plug-in 1102 can poll the embedded browser 410 based on a time interval (e.g., periodically such as every 5 seconds, 10 seconds, 20 seconds, 30 seconds, 60 seconds, 2 minutes, 3 minutes or other time interval) to determine whether a network application 406 has been launched. The plug-in 1102 can detect the launch of the application responsive to the launch of the application. For example, the plug-in 1102 can include a hooking component that can detect application launch commands. The plug-in 1102 can perform a screen capture of the display and parse the screen capture to determine whether a network application has been launched.

The plug-in 1102 can identify a session identifier associated with the client device 402. The session identifier can be associated with the embedded browser 410. The session identifier can be associated with the network application 406. The session identifier can be associated with a user or user identifier of the client device 402. The plug-in 1102 can query the embedded browser 410 or other determine the session identifier. The plug-in 1102 can be configured with a user identifier, which the plug-in can utilize to determine the corresponding session identifier. For example, the plug-in 1102, in communication with the server 430 can correlate the user identifier associated with the plug-in 1102 with the session identifier associated with the launch of the network application 406. For example, the server 430 can perform a lookup with the account identifier in the accounts data structure 1112 stored in the data repository 1110 to determine the corresponding session identifier, if the session identifier is stored in the account data structure 1112 responsive to launching of the network application 406.

The state sharing plug-in 1102 can identify one or more electronic messaging applications on the client device 402. The electronic messaging application 1104 can refer to a social networking application, chat messaging application, instant messaging application, direct messaging application, group messaging application or other type of electronic application or program that can exchange messages or communications between users of the application. The electronic messaging application 1104 can refer to or include applications for which a user may log in and be in an online state in order to receive a message. The electronic messaging application can include a text-based application in which text messages are communicated to another user. The electronic messaging application can exchange images, videos, audio, or other types of messages. In some cases, the application can exchange audio messages, such as voice input.

The electronic messaging application 1104 can be associated with a messaging application system 1114. The messaging application system 1114 can include one or more processors, memory or servers. The messaging application system 1114 can refer to a backend messaging system. The messaging application system 1114 can refer to or include a social application server or system. The messaging application system 1114 can be hosted in a cloud infrastructure, such as cloud 175. The messaging application system 1114 can be provided by a third-party that is different from a provider of the server 430 or client device 402. The messaging application system 1114 can be administered by an entity that is different from an entity administering the server 430 or client device 402. The messaging application system 1114 can be managed independently from the server 430 and the client device 402.

The messaging application system 1114 can receive messages from a first instance of an electronic messaging application 1104 executing on a first client device 402, and forward the messages to a second instance of the electronic messaging application executing on a second client device 402. In some cases, the messages can be exchanged between the first and second client devices 402 and bypass the messaging application system 1114.

The state sharing plug-in 1102 can determine whether an electronic messaging application 1104 is installed on the client device 402. The state sharing plug-in 1102 can determine whether the electronic messaging application 1104 is executing or running on the client device 402. The state sharing plug-in 1102 can use one or more techniques or functions to determine which, if any, electronic messaging applications 1104 are installed on the client device 402. For example, and in some cases, the list of installed electronic messaging applications 1104 can be predetermined. An administrator of the client device 402 can install a predetermine set of one or more electronic messaging application 1104, and configure the plug-in 1102 with the list of installed messaging applications 1104. This can result in all client devices 402 associated with an entity or computing environment having the same messaging applications 1104 installed.

In some cases, the plug-in 1102 can prompt the user to input which messaging applications 1104 are installed on the client device 402. The prompt can include an input text box, menu, or selection to allow the user to input or provide an indication of the one or more installed electronic messaging applications 1104.

In some cases, the plug-in 1102 can automatically determine which messaging applications 1104 have been installed. For example, the plug-in 1102 can be configured to use a script such as a get-program script. The plug-in 1102 (e.g., via client application 404) can launch a power shell window to run a script to generate a list of electronic messaging applications 1104 installed on the client device.

In another example, the plug-in 1102 can access a menu (e.g., a start menu) on the operating system listing installed applications. In another example, the plug-in 1102 can access a task manager of the operating system to determine what programs are currently executing on running on the client device 402. Thus, the plug-in 1102, either directly or indirectly via client application 404, can execute a script or otherwise query or poll the client device 402 to determine which electronic messaging applications 1104 are installed on the client device 402.

Upon determining which electronic messaging applications 1104 are installed on the client device 402, the plug-in 1102 can perform one or more actions or transmit one or more instructions or commands. The plug-in 1102, for example, can transmit an instruction to one or more servers (the messaging application system 1114) managing the one or more electronic messaging applications 1104. The instruction can cause the messaging application system 1114 to control a state of the one or more electronic messaging applications 1104. In some cases, the plug-in 1102 can transmit the indication or instruction to the server 430, which in-turn can transmit an instruction to the messaging application system 1114 to cause the state manager 1116 of the messaging application system 1114 to control the state of the electronic messaging application 1104. Responsive to the plug-in 1102 detecting the launch of the network application 406 via the embedded browser 410, the plug-in 1102 can cause the state manager 1116 of the electronic messaging application system 1114 to control a state associated with the electronic messaging application 1104 installed or executing on the client device 402.

To do so, the server 430 can receive an indication from the client device 402. The server 430 can receive an indication from the plug-in 1102 of an event on the client device 402 (e.g., the launch of the network application 406). The plug-in 1102 can provide an indication of the launch of the network application 406 to the server 430. The plug-in 1102 can provide an indication to the server 430 of the user identifier, account identifier, or session identifier associated with the client device 402.

The server 430 can include a state controller 1106 designed, constructed and operational to determine to control a state of an electronic messaging application 1104. The state controller 1106 can determine to control a state of the electronic messaging application 1104 responsive to an event. The state controller 1106 can receive the indication of the event from the state sharing plug-in 1102, for example. Example events can include the launch of a network application 406, a type of activity being performed via the network application 406 (e.g., keyboard input, mouse input, audio output, video output, or image output), or termination of the network application 406.

The state controller 1106 can receive the indication of the event from the plug-in 1102, and determine to control a state of the electronic messaging application 1104 installed on the client device 402. To do so, the state controller 1106 can interface with a SaaS interaction service 1108 to interface with the messaging application server 1114. The state controller 1106 can transmit a command, instruction or otherwise communicate with the SaaS interaction service 1108 to cause the messaging application system 1114 to control a state associated with the electronic messaging application 1104. The state controller 1106 can be configured with one or more functions, rules, policies or scripts to control a state of the electronic messaging application 1104 responsive to detection an event associated with the embedded browser 410.

For example, the state controller 1106 can receive an indication of a launch event associated with a network application 406. The state controller 1106 can receive the indication of the launch event from the state sharing plug-in 1102 on the client device 402. Responsive to receiving the indication of the launch event, the state controller 1106 can invoke a SaaS interaction service 1108 to establish a communication channel with the messaging application server 1114. In the event a communication channel is already established with the messaging application server 1114, the state controller 1106 interface with the SaaS interaction service 1108 to providing instructions to the messaging application system 1114 via the established communication channel.

The server 430 can include at least one SaaS interaction service 1108 designed, constructed and operational to establish a communication channel with the messaging application system 1114. The SaaS interaction service 1108 can include a micro application executing in a cloud computing environment. The SaaS interaction service 1108 can be configured to leverage a single sign-on ("SSO") feature established by an administrator of the server 430. SSO can refer to a property of identity and access management that allows users to securely authenticate with multiple network applications 406 and electronic messaging applications 1104 by logging in only once—with just one set of credentials (e.g., username and password). The network application 406 and electronic messaging application 1104 accessed by the user of the client device 402 can rely on an entity (e.g., the server 430 or administrator thereof) to verify that users are who they say they are. The server 430 can maintain accounts 1112 in the data repository 1110 storing authentication or credentialing information for the users, which can be used to facilitate SSO features. The SaaS interaction service 1108, configured with SSO, authentication can rely on a trust relationship between domains, applications or websites. For example, with SSO, the messaging application system 1114 can first check to see whether the client device 402 has been authenticated by the SSO solution, in which case the system 1114 can grant access to the client device 402. If the client device 402 has not yet been authenticated, then the SSO function is invoked. Upon invocation of the SSO function, the SaaS interaction service 1108 can prompt the user to login using login credentials established for a corporate entity, for example. The SaaS interaction service 1108 can request authentication from the identity provider or authentication system, which can verify the identity of the user and accordingly notify the SaaS interaction service 1108. The SaaS interaction service 1108 can pass this authentication data to the messaging application system 1114, and grant the client device 402 (e.g., the electronic messaging application 1104) access to the messaging application server 1114. The authentication verification data can include tokens, for example.

With this approach, the SaaS interaction service 1108 can communicate with the messaging application server 1114. For example, the SaaS interaction service 1108 can determine that the electronic messaging application 1104 has been configured to function with the SSO functionality provided by the SaaS interaction service 1108. The server 430 can determine that SSO is configured for the electronic messaging application 1104 determined by the plug-in 1102 to be installed on the client device 402. For example, the accounts data structure 1112 in data repository 1110 can include an indication that the electronic messaging application 1104 is associated with an account identifier of a user of the client device 402, and further determine that SSO has been configured or established for the electronic messaging application 1104. Each electronic messaging application 1104 can be associated with an identifier that can identify the name of the application, provider of the application or type of the application. Using this information, the server 430 can determine whether the corresponding electronic messaging application 1104 has been configured for SSO for the user. The account data structure 1112 can include, for example, a table or mapping between electronic messaging applications 1104 and account identifiers, for example. Should such a mapping exist for the electronic messaging application 1104 installed on the client device 402, then the server 430 can determine to invoke SSO functionality to control a state of the electronic messaging application 1104.

In some cases, the client device 402 or server 430 can identify, based at least in part on the session identifier, authentication credentials for the user for an electronic messaging application. The client device 402 or server 430 can establish, using the authentication credentials, a communication session with the messaging application system 1114 that manages the electronic messaging application. The authentication credentials can be retrieved from a storage device of the client device 402. The authentication credentials can be retrieved or obtained from the accounts data structure 1112. The authentication credentials can be input by a user of the client device 402 responsive to a prompt for authentication credentials. The client device 402 or the server 430 can establish the communication session using a single sign-on authentication technique. For example, the SaaS interaction service 1108 can establish the communication session using the SSO authentication technique.

The messaging application system 1114 can include a state manager 1116 designed, constructed and operational to manage, maintain, update, or set a state of an electronic messaging application 1104 for a user. The state can refer to, for example, online, busy, away, offline, do not disturb, or other state information. The state manager 1116 perform one or more functions based on the state, or determine not to perform one or more functions based on the state. The state can correspond to a session or instance of an electronic messaging application 1104 executing or installed on a client device 402. The state can correspond to a user or account identifier of the electronic messaging application 1104.

For example, a state of online can indicate that the user of the client device 402 with the electronic messaging application 1104 is connected to the network 170A and messaging application system 1114. The state of online can indicate that the user has been authenticated or established a communication session with the messaging application system 1114. The state of online can indicate that the client device 402 can exchange messages via the electronic messaging application 1104 with other client devices 402.

The state of busy can indicate that the user of the client device 402 may be in a meeting, telephone call, or otherwise busy. The state of busy can indicate that the user is authenticated and has established a communication session with the messaging application system 1114 such that messages may be exchanged, while not desired or optimal due to the user being busy with some other task via the client device 402 or otherwise.

The state of do not disturb can indicate that the user wishes not to be disturbed. The user can proactively set a state to do not disturb. The do not disturb state can prevent electronic messages from being exchanged via the electronic messaging application 1104. The state of do not disturb can prevent notifications of electronic messages from being presented via an output interface of the client device 402, for example.

The state of away can indicate that the user had logged in to the messaging application system 1114 and established a communication session by which electronic messages can be exchanged via the electronic messaging application 1104. However, the state of away can indicate that the user may not have interacted with the client device 402 for a predetermined amount of time. The client device 402 may be idle for the predetermined amount of time in that the client device 402 may not have received any user input via a user interface, such as a keyboard, mouse or touch interface.

The state of offline can indicate that the user may not be connected to the network 170A. The state of offline can indicate that the user has not established a communication session with the messaging application system 1114. The state of offline can indicate that the client device 402 currently does not have an active communication session with the messaging application system 1114. The state of offline can indicate that the client device 402 is currently not capable of exchanging messages via the electronic messaging applications 1104. Responsive to the state being offline, the messaging application system 1114 can block or otherwise prevent delivery of electronic messages to the client device 402 in the offline state.

The messaging application system 1114 can receive an indication from the server 430 (e.g., the state controller 1106 or the SaaS interaction service 1108) to control a state of the electronic messaging application 1104 for a user or account identifier associated with a client device 402. The state messaging application system 1114 can receive an instruction or command from the server 430 responsive to the server 430 detecting or identifying an event on the client device 402 (e.g., launch of the network application 406 or termination of the network application 406).

The state manager 1116 can update the state of the electronic messaging application 1104. The state manager 1116 can update the state for a user or account identifier associated established for a user of the electronic messaging application 1104 or user of the client device 402. The state manager 1116 can store the state information in memory of the state manager 1116 or messaging application system 1114. The state manager 1116 can maintain the state information for each user account in a central repository of or accessible to the state manager 1116. The state manager 1116 can provide the state information, and updated state information, to each client device 402 or instance of the electronic messaging application 1104 that has an active communication session with the messaging application system 1114. The state manager 1116 can push the state information or updated state information. The state manager 1116 can push the state information based on a time interval, such as a periodic time interval (e.g., 1 second, 2 seconds, 5 seconds, 10 seconds, 30 seconds, 60 seconds, 2 minutes, 5 minutes, 10 minutes, or some other interval). The state manager 1116 can provide the state information to a client device 402 responsive to a request for state information. For example, the client device 402 (e.g., via the electronic messaging application 1104) can poll the state manager 1116 for state information associated with other account identifiers. The client device 402 can poll the state manager 1116 based on a time interval, such as a periodic time interval (e.g., 1, second, 2 seconds, 5 seconds, 10 seconds, 30 seconds, 60 seconds, 2 minutes, 5 minutes, 10 minutes, or some other interval). The client device 402 can request updated state information responsive to a user request or instruction. For example, a user can refresh the state user interface presented via the electronic messaging application 1104, causing the client device 402 to transmit a request to the state manager 1116 for updated state information of one or more other user accounts. The state manager 1116 can provide updated state information responsive to a change or update to state information associated with one or more accounts.

The state manager 1116 can use one or more techniques to update the state information. For example, the state manager 1116 can update the state information pursuant to instructions received from the state controller 1106 of the server 430. The state controller 1106 of the server 430 can be configured with a state update policy for an account. The state controller 1106, using the state update policy, can determine a next state of an account of the electronic messaging application 1104. The state controller 1106 can determine the next state based on the event detected by the state sharing plug-in 1102 executed by the client device 402. For example, if the state sharing plug-in 1102 detects the launch of a network application 406, the state controller 1106, responsive to receiving the indication of the launch event, can determine to update the state of the electronic application 1104 to "busy" or "do not disturb", thereby preventing or reducing the exchange of electronic messages with the client device 402 while the network application 406 is being used via the embedded browser 410.

In some cases, the state controller 1106 can update the state to "offline" to block the exchange of any electronic messages, even though the client device 402 may maintain an active connection to the messaging application system 1114. In some cases, the state controller 1106 can terminate a communication session between the client device 402 and the electronic messaging application system 1114, thereby forcing the client device 402 to re-establish the communication session in order to enter an online state for the electronic messaging application.

If the state controller 1106 detects the termination of a network application 406, or that there are no network applications 406 currently executing via the embedded browser 410, the state controller 1106 can determine to update the state to a state that allows for the exchange of electronic messages with the client device 402, such as an online state.

In some cases, the state controller 1106 can provide an indication of the account identifier and detected event to the state manager 1116 to cause the state manager 1116 to use one or more policies to determine the next state. The determined next state can be a same state, or a different state than a current state. A first state can be an online state, and a second state subsequent to the first state can be a busy state, do not disturb state, of offline state, for example. Thus, in some cases the state controller 1106 can determine the next state, and in some cases the state manager 1116 can determine a next state.

Upon updating the state, the messaging application system 1114 can push, forward, relay, or otherwise provide the state information to client devices 402 executing instances of the electronic messaging application 1104 that present state information. The messaging application system 1114 can block delivery of messages based on the state (e.g., do not disturb). The messaging application system 1114 can store or buffer electronic messages during a state (e.g., offline or do not disturb), and then provide all received messages when the state changes to online, for example.

The state sharing plug-in 1102 can detect the launch of a network application 406 via the embedded browser 410, and update the state of an electronic messaging application 1104 hosted by a third party messaging application system 1114. The state sharing plug-in 1102 can be configured to not detect events that occur outside the embedded browser 410. The state sharing plug-in 1102 can be configured to not detect application events that occur outside the embedded browser 410. The state sharing plug-in 1102 can be configured to not detect the launch or termination of applications that are not network application 406. For example, if the user launches a local application installed on the client device 402 without using the embedded browser 410, then the state sharing plug-in 1102 may not detect the launch of this local application (which is not a network application 406). Accordingly, the state sharing plug-in 1102 may not update the state of the electronic messaging application 1104 because the state sharing plug-in 1102 did not detect the launch of the local application. In some cases, even if the state sharing plug-in 1102 detects the launch of the local application, the state sharing plug-in 1102 can determine that the local application is different from or not the same as the network application 406, and determine not to update the state of the electronic messaging application 1104. Thus, the state sharing plug-in 1102 can be configured to only update the electronic messaging application 1104 responsive to events associated with network applications 406 that are executed or rendered via the embedded browser 410.

Figure 12:
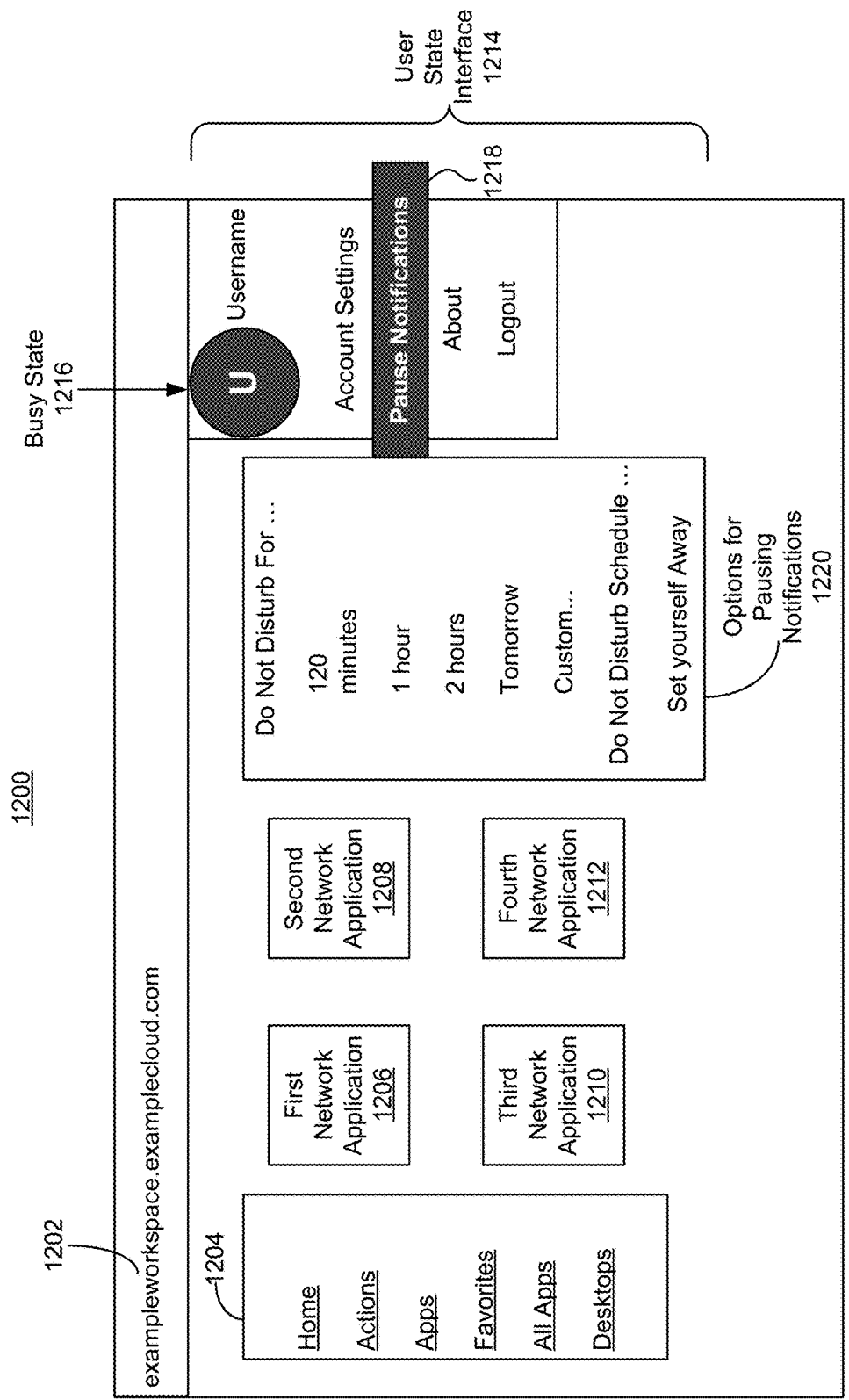
FIG. 12 depicts an illustration of a computing workspace and a state, in accordance with an implementation.

FIG. 12 depicts an illustration of a computing workspace and a state, in accordance with an implementation. The graphical user interface ("GUI") 1200 can represent an interface presented via the client application 404 or embedded browser 410. The GUI 1200 can be provided by client device 402. For example, the client application 404 can include a web browser that can launch or provide an embedded browser 410. The client application 404 or embedded browser 410 can provide GUI 1200 to a user of the client device 402. As illustrated in GUI 1200, the client application 404 can provide an input text bar 1202 in which a uniform resource locator ("URL") or IP address can be entered by a user (e.g., exampleworkspace.examplecloudDOTcom).

The client application 404, via GUI 1200, can present a menu 1204 with one or more buttons, links, or GUI elements or widgets. These buttons can link to content or perform actions, such as Home, Actions, Apps, Favorites, All Apps, and Desktops. A user of the client device 402 can select a button in menu 1204, such as Apps, to access or one or more network applications. For example, upon electing Apps or all apps, the client application 404, via GUI 1200, can present one or more network applications: First Network Application 1206, Second Network application 1208, Third Network Application 1210, and Fourth Network Application 1212. The first to fourth network applications 1206-1212 can include one or more component or functionality of a network application 406 depicted in FIG. 4. For example, each of network application 1206-1212 can correspond to a type of network application 406.

The client application 404 or embedded browser 410, via GUI 1200, can present information associated with a state of the user. The embedded browser 410 can provide a state interface 1214. The state interface 1214 can be an interactive graphical user interface with one or more menus, elements, or buttons. The state interface 1214 can provide an indication of the username that is current logged in and authenticated to the server 430. The state interface 1214 can include an indication of the current state 1216 or state information of the user. The state information can be a status or state such as Busy State 1216. The state information can maintained by state manager 1116. The state information 1216 can be managed or controlled by state controller 1106.

The state interface 1214 can provide an interactive menu with one or more selections, such as Account Settings, Pause Notifications 1218, About, or Logout. The user can select or otherwise interact with the Pause Notifications 1218 menu item to access Options for Pausing Notifications 1220 (e.g., additional items or actions associated with pausing notifications). The Option for Pausing Notifications 1220 can include do not disturb. The user can change their state to do not disturb for a time interval. The do not disturb state can be associated with a predetermined time interval, such as 120 minutes, 1 hour, 2 hours, tomorrow, or a custom time interval. The user can set a do not disturb schedule. The state controller 1106 can receive the do not disturb schedule and automatically set the state of the user responsive to or in accordance with the schedule. For example, the schedule can be: do not disturb from 8-11 AM and 2-5 PM Monday-Friday, online from 11 AM to 2 PM Monday-Friday, and offline from 5 PM Friday to 8 AM Monday. The user can set any schedule, or override a schedule in effect via the user state interface 1214. For example, the user can update the state to away via 1220.

Figure 13:
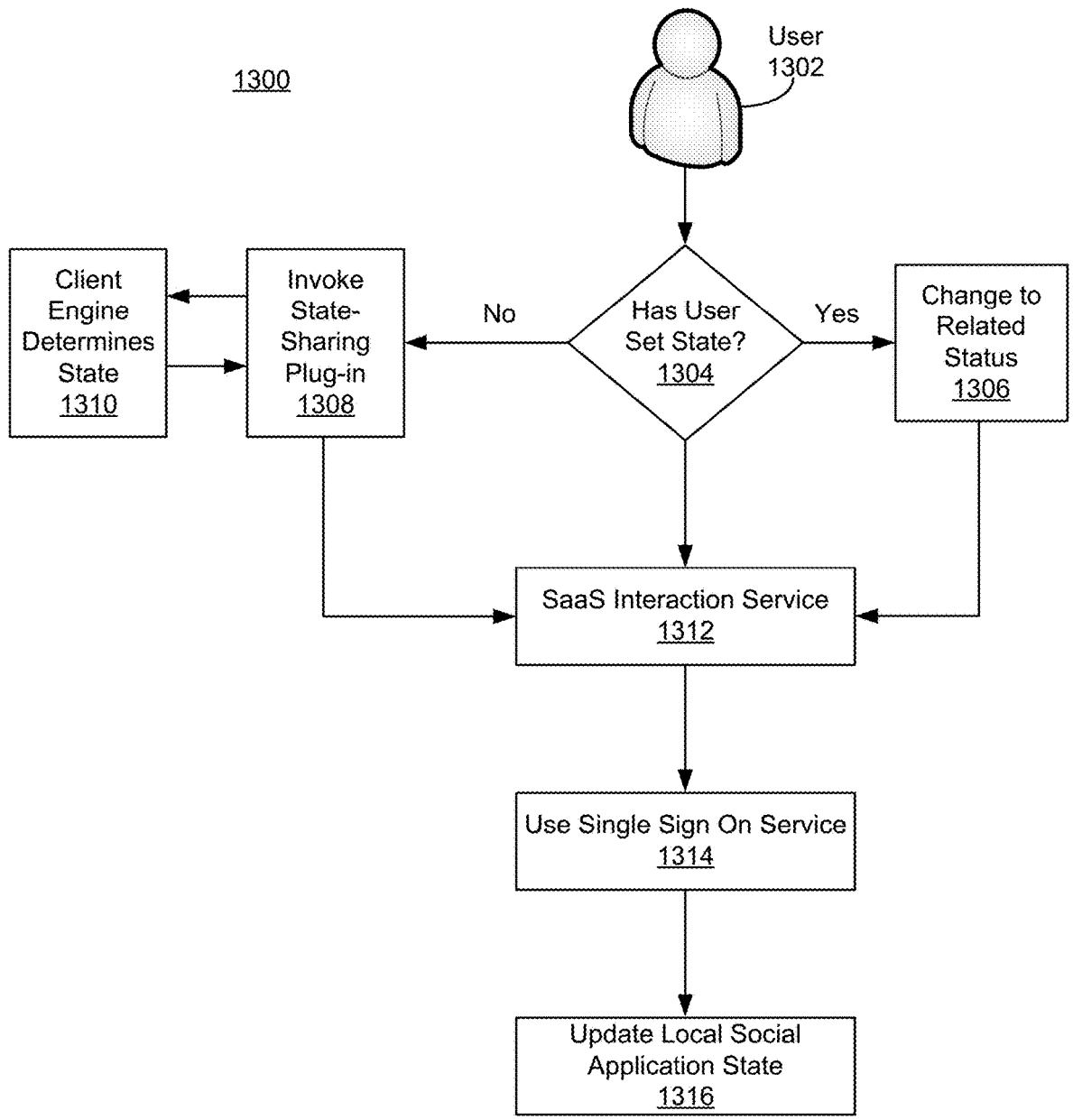
FIG. 13 is a flow diagram for sharing a state via a plug-in, in accordance with an implementation.

FIG. 13 is a flow diagram for sharing a state via a plug-in, in accordance with an implementation. The method 1300 can be performed by one or more systems or components depicted in FIG. 11, including, for example, a client device, server, or messaging application system. For example, the method 1300 can be performed by one or more processors associated with one or more of the client device, server, or messaging application. At 1302, a user, such as a user of a client device, can access or use the client device. The user can launch a client application or access an embedded browser. The user can launch a network application. At 1302, the user can log into a workspace or application using credentials.

At 1304, the one or more processors can determine whether the user has set a state or status. The one or more processors can detect whether the user has set a duration for pausing notifications. The one or more processors 1304 can determine whether a user has updated the state within a predetermined time period. The one or more processors can determine whether the user has updated a state at all during this computing session. The one or more processors can determine whether the state is a default state or a state set by the user.

If the one or more processors determines that the user has updated a state, the one or more processors can proceed to 1306. At 1306, the one or more processors can update the state for the user based on the state set by the user. In some cases, the state can refer to the state of the user with regard to electronic messaging. The state can refer to the state of the user with regard to whether or not user is to receive electronic messages, or desires to receive electronic messages. The one or more processors can update a state of an electronic messaging application maintained by a third-party electronic messaging service provider. The one or more processors can maintain a state of the state of the user to provide an indication of the state of the user to one or more other users or client devices that communicate or interface with the server 430, or that are administered by a same entity as the server 430.

If, at decision block 1304, the one or more processors determine that the user has not set a state of the user, the one or more processors can proceed to 1308. For example, responsive to determining that the user has not set a state, the one or more processors determine to automatically perform a polling check to get the latest ICA session, which can represent the status of the user. At 1308, the one or more processors can invoke a state sharing plug-in. The state sharing plug-in can launch or be executed by a client application executing on the client device. The state sharing plug-in can interface with a client engine executing on the client device in order to determine a state of the client device. At 1310, the client engine can determine a state of the client device or user. The client engine can determine whether any network applications are being accessed by the client device. A network application can refer to an application hosted in a cloud or server remote from the client device. The client engine can determine whether any network applications are being accessed via a protocol. For example, the state-sharing plug-in can perform a polling check by calling a client engine in a computing workspace based on a time interval (e.g., every 30 minutes, 15 minutes, 10 minutes, 40 minutes, or other time interval). The client engine can return the session status. The client engine can provide the information to the state sharing plug-in via 1310 and 1308. The one or more processors take this status into account to determine whether or not the user is working. Meanwhile, the state-sharing plug-in can change the status according to this status at workspace.

The state sharing plug-in can include the main logic for changing the state or status of the user. The state sharing plug-in can have a customized definition or be configured for automatic polling. The user can set the period of no disturb by themselves when they log in to the computing workspace (e.g., CEB), and the status at the workspace can change to red or busy, and this status can be automatically sync to the local social application via the SaaS Interaction Service.

The state sharing plug-in can also perform automatic polling. When the user logs in to the computing workspace or CEB environment and launches an SaaS application (e.g., network application) for working, the state sharing plug-in can automatically detect a client engine for getting an ICA session status, which can represent the status of the user every 30 minutes. If there is no ICA session available, the status at workspace can be changed to busy. This busy signal can be sent to the SaaS Interaction Service to automatically synchronize the status of a local social application.

The one or more processors can receive the state information, which can be set by the user or determined via a state sharing plug-in or client engine. The one or more processors can proceed to 1312 to launch a SaaS interaction service in order to update the state information. The SaaS interaction service can determine to a next state to set for the user. The SaaS interaction service can determine the next state based on receiving the state information via acts 1306, 1308, or 1310. The SaaS interaction service can use a policy to determine the next state based on receiving information from acts 1306, 1308, or 1310.

The SaaS Interaction Service can be micro application implementation in a cloud environment. The SaaS service can communicate with the state-sharing plug-in. When a user chooses to customize their status or setup automatically polling, the state sharing plug-in can send the related status synchronize request to the SaaS Interaction Service ("SIS"). The SIS can inform the local social application to keep the status with the same as workspace via an API. The SIS can inform the local social application via SSO with the credentials the user uses to log in to the computing workspace.

Upon determining the next state, the SaaS interaction service can launch or use a single sign on service 1314 to communicate with a third-party electronic messaging system. The one or more processors can synchronize the state of the user with different social applications. The one or more processors or SaaS interaction service can use a single sign on ("SSO") service to synchronize the state of the user across social applications. The one or more processors can use the SSO to establish a communication session with the electronic messaging application, which can include or refer to a local social application. The local social application can be managed, maintained or provided by a third-party social application provider. The one or more processors can use authentication credentials associated with the user 1302 to establish a secure communication session or channel with the third-party social application provider system. The one or more processors can provide an instruction or command via the secure communication session to the third-party social application provider system. The one or more processors can provide an instruction or command to update or control the state for the user. The state can include, for example, busy, do not disturb, online, active, away, offline, etc. For example, if the user launches a network application, the one or more processors can change the state to do not disturb. If, in another example, the user terminates all network applications run via the embedded browser, the one or more processors can update the state to online.

Figure 14:
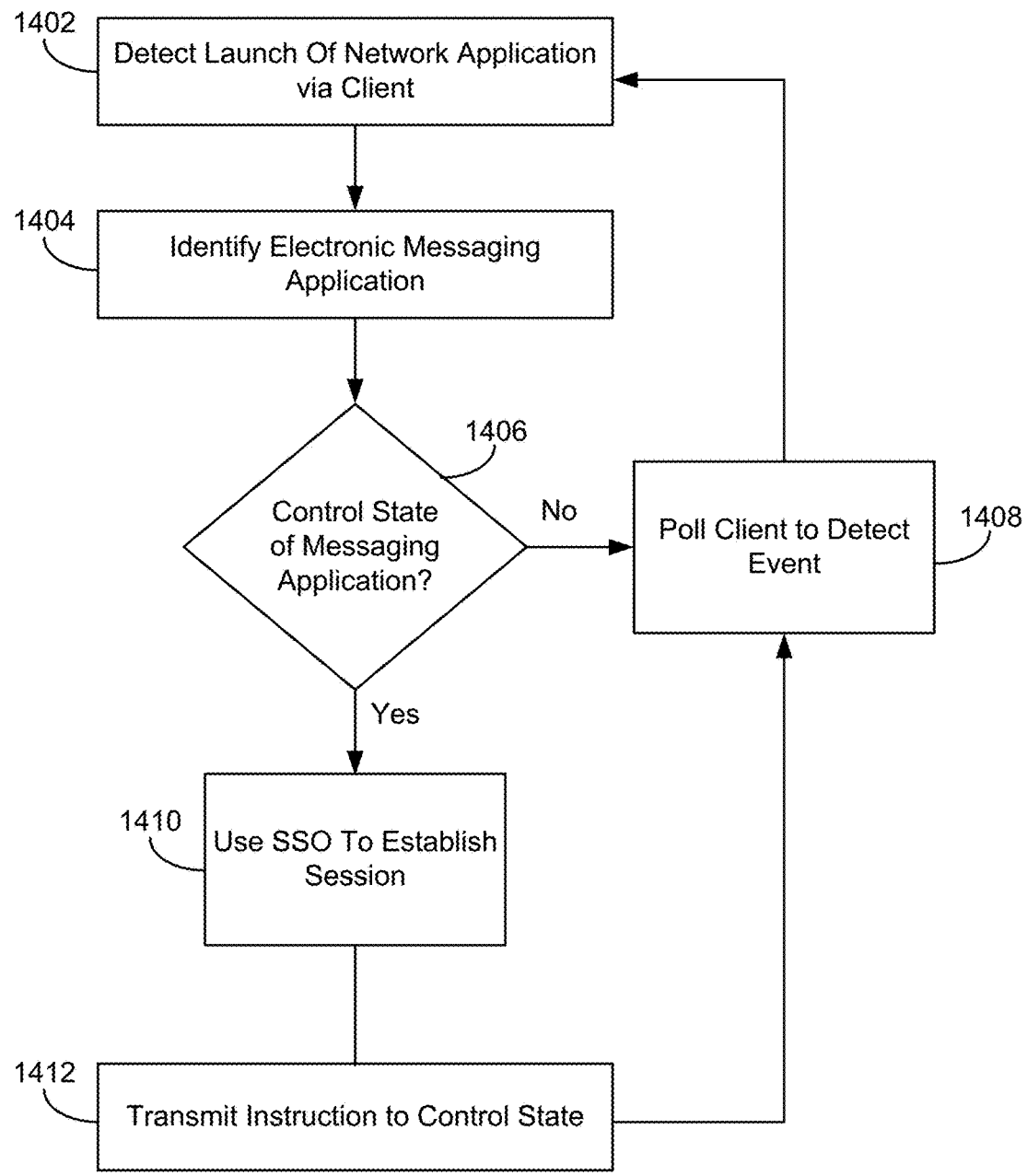
FIG. 14 is depicts an example flow diagram of a method for sharing a state via a plug-in, in accordance with an implementation.

FIG. 14 is depicts an example flow diagram of a method for sharing a state via a plug-in, in accordance with an implementation. The method 1400 can be performed by one or more processors. For example, the method 1400 can be performed by one or more processors of a client device, server, or messaging application system. In brief overview of method 1400, the one or more processors can detect the launch of a network application via a client device at ACT 1402. At ACT 1404, the one or more processors can identify an electronic messaging application. At decision block 1406, the one or more processors can determine whether to the control the state of the messaging application. If, at decision block 1406, the one or more processors determine not to control the state, the one or more processors can proceed to ACT 1408 to continue polling the client device to detect an event. If, however, at decision block 1406 the one or more processors determine to control the state, the one or more processors can proceed to ACT 1412 and transmit an instructions to control the state.

Still referring to FIG. 14, and in further detail, the one or more processors can detect the launch of a network application via a client device at ACT 1402. The one or more processors can detect the launch of the network application via a state sharing plug-in or a client engine executing or running on a client device. A user of the client device can launch the network application. The launch of the network application can include a server remote from the client device hosting the network application or at least partially executing the network application. The user can launch the network application via a CEB accessed via the client device. A state sharing plug-in can detect the launch event, or poll a client engine executing on the client device for information regarding any network applications executed via the CEB.

At ACT 1404, the one or more processors can identify an electronic messaging application. The one or more processors can determine which, if any, electronic messaging applications are installed on the client device. The one or more processors can determine whether any electronic messaging applications are running on the client device. Electronic messaging applications can include or refer to social applications, such as instant messaging applications, messenger applications, direct messaging applications, group messaging applications, etc.

The one or more processors can poll or query a registry or task manager of a client device to determine which social applications are installed or executing on the client device. The one or more processors can access a file or memory storing information about the social applications. The one or more processors can provide a prompt to a user of the client device to indicate which social applications are installed or running on the client device. The one or more processors can access a profile of the user to determine information about social applications. In some cases, an administrator associated with the client device can indicate the social applications.

At decision block 1406, the one or more processors can determine whether to control the state of the messaging application. The one or more processors can determine whether to the change the state based on an event associated with the client device, or keep the state the same. The one or more processors can determine whether to control the state based on an event associated with a CEB of the client device. The event can include the launch of a network application. The event can include the termination of the network application. The one or more processors can use a policy, rules, logic or other technique to determine whether to change, set, provide, establish or otherwise control the state. For example, responsive to a launch of the network application, the one or more processors can determine to control the state to a busy or do not disturb state. Responsive to a termination of one or all network applications, the one or more processors can determine to set the state to online or active.

If, at decision block 1406, the one or more processors determine not to control the state, the one or more processors can proceed to ACT 1408 to continue polling the client device to detect an event. The one or more processors can determine not to control the state if the detected event is not one of a launch of termination of the application, for example. The one or more processors can determine not to control the state based on a configuration or policy, or schedule. The user can disable automatic control of the state, or enable automatic control of the state. The user can establish a schedule during which automatic control of the state of the user is blocked or disabled for a predetermined time period, but otherwise enabled during other time periods. Thus, based on a current time period, the one or more processors can determine not automatically control the state of the user.

If the one or more processors determine not to control the state, the one or more processors can continue to poll the client device or CEB at 1408 to detect an event. The one or more processors return to ACT 1402 upon detecting the launch of a network application.

If, however, at decision block 1406 the one or more processors determine to control the state, the one or more processors can proceed to ACT 1410 to use a SSO service to establish a communication session with a third-party provider of the social application or messaging application. The administrator of the client device or server or network application can provide a SSO service for the user, which the one or more processors can use to access the third-party social application server or system. The one or more processors can establish the communication session with the third-party server using the SSO in order to set, control, update, change or otherwise manage or maintain the state of the user responsive to detection of an event associated with the CEB.

Upon establishing the SSO, the one or more processors can proceed to ACT 1412 and transmit instructions to control the state of the user. The one or more processors can control the state with regard to the social application. The one or more processors can set the state of the user to busy, do not disturb, offline, away, or online. For example, the one or more processors can control the state to disable transmission of electronic messages via the electronic messaging application (or other social application) to the client device of the user. In another example, the one or more processors can control the state to disable notification of transmission of electronic messages via the one or more electronic messaging applications to the user. For example, the one or more processors can transmit an instruction to disable the presentation of prompts or popups that provide a notification of a message via the social application.

In some cases, the one or more processors can detect termination of one or more network applications provided via a CEB. The one or more processors can determine termination of all network applications provided by a CEB. The one or more processors can determine that there are no previously launched network applications being accessed via a CEB. Responsive to termination of the network applications previously launched via the CEB, the one or more processors can transmit an instruction to the third-party provider of the electronic messaging applications to update the state to a second state different from the prior state, wherein the second state allows delivery of notifications related to electronic messages transmitted to the user. For example, the one or more processors can update the state to a busy state responsive to detecting the launch of the network application via the CEB, and then update the state to an online state responsive to detecting that all network applications previously launched have been terminated (or connections to the network applications have been terminated, or sessions with the network application have been terminated).

The above-mentioned elements or entities may be implemented in hardware, or a combination of hardware and software, in one or more embodiments. Components may be implemented using hardware or a combination of hardware or software detailed above in connection with FIGS. 1A-1B. For instance, these elements or entities can include any application, program, library, script, task, service, process or any type and form of executable instructions executing on hardware of a device. The hardware includes circuitry such as one or more processors in one or more embodiments.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

It will be further understood that various changes in the details, materials, and arrangements of the parts that have been described and illustrated herein may be made by those skilled in the art without departing from the scope of the following claims.

What is claimed is:

1. A method of controlling a state of electronic messaging applications, comprising:
   detecting, by one or more processors, a launch of a network application via an embedded browser, the network application associated with a session identifier of a user;

identifying, by the one or more processors, one or more electronic messaging applications on a client device of the user; and transmitting, by the one or more processors responsive to the launch of the network application associated with the session identifier, an instruction to one or more servers managing the one or more electronic messaging applications to control a state of the one or more electronic messaging applications, wherein detecting the launch of the network application comprises detecting the launch of the network application by a client application executing on the client device, and wherein transmitting the instruction to one or more servers comprises transmitting, by a remote server hosting the network application, to the one or more servers managing the one or more electronic messaging applications, the instruction to control the state of the one or more electronic messaging applications.

2. The method of claim 1, comprising:
identifying, by the one or more processors, based at least in part on the session identifier, authentication credentials for the user for a first electronic messaging application of the one or more electronic messaging applications;
establishing, by the one or more processors using the authentication credentials, a communication session with a first server of the one or more servers that manages the first electronic messaging application; and
transmitting, via the communication session, the instruction to control the state of the first electronic messaging application.

3. The method of claim 2, comprising:
establishing, by the one or more processors, the communication session using a single sign-on authentication technique.

4. The method of claim 1, comprising:
controlling, by the one or more processors, the state to disable transmission of electronic messages via the one or more electronic messaging applications to the client device of the user.

5. The method of claim 1, comprising:
controlling, by the one or more processors, the state to disable notification of transmission of electronic messages via the one or more electronic messaging applications to the user.

6. The method of claim 1, comprising:
transmitting, by the one or more processors, the instruction to update the state to a busy state.

7. The method of claim 1, comprising:
identifying, by the one or more processors, the one or more electronic messaging applications executing on the client device.

8. The method of claim 1, comprising:
terminating, by the one or more processors, network applications previously launched via the embedded browser; and
transmitting, by the one or more processors responsive to termination of the network applications, a second instruction to the one or more electronic messaging applications to update the state to a second state different from the state, wherein the second state allows delivery of notifications related to electronic messages transmitted to the user.

9. The method of claim 1, comprising:
displaying, by the one or more processors, the state of the one or more electronic messaging applications for the user via a user interface element provided by the embedded browser that launches the network application.

10. A system to control a state of electronic messaging applications, comprising:
one or more processors and memory to:
detect a launch of a network application via an embedded browser, the network application associated with a session identifier of a user;
identify one or more electronic messaging applications on a client device of the user; and
transmit, responsive to the launch of the network application associated with the session identifier, an instruction to one or more servers managing the one or more electronic messaging applications to control a state of the one or more electronic messaging applications,
wherein to detect the launch of the network application comprises to detect the launch of the network application by a client application executing on the client device, and
wherein to transmit the instruction to one or more servers comprises to transmit, by a remote server hosting the network application, to the one or more servers managing the one or more electronic messaging applications, the instruction to control the state of the one or more electronic messaging applications.

11. The system of claim 10, wherein the one or more processors are further configured to:
identify, based at least in part on the session identifier, authentication credentials for the user for a first electronic messaging application of the one or more electronic messaging applications;
establish, using the authentication credentials, a communication session with a first server of the one or more servers that manages the first electronic messaging application; and
transmit, via the communication session, the instruction to control the state of the first electronic messaging application.

12. The system of claim 11, wherein the one or more processors are further configured to:
establish the communication session using a single sign-on authentication technique.

13. The system of claim 10, wherein the one or more processors are further configured to:
control the state to disable transmission of electronic messages via the one or more electronic messaging applications to the client device of the user.

14. The system of claim 10, wherein the one or more processors are further configured to:
control the state to disable notification of transmission of electronic messages via the one or more electronic messaging applications to the user.

15. The system of claim 10, wherein the one or more processors are further configured to:
transmit the instruction to update the state to a busy state.

16. The system of claim 10, comprising:
a client application executing on the client device configured to detect the launch of the network application via the embedded browser, and transmit the instruction to the one or more servers responsive to detection of the launch.

17. A system to control a state of electronic messaging applications, comprising:
an embedded web browser that executes on a client device having memory and one or more processors; and a client application in communication with the embedded web browser to:

detect a launch of a network application via the embedded web browser, the network application associated with a session identifier of a user;

identify one or more electronic messaging applications on the client device;

provide, responsive to the launch of the network application associated with the session identifier, an instruction to one or more servers managing the one or more electronic messaging applications to control a state of the one or more electronic messaging applications; and transmit, to a remote server, the instruction to control the state of the one or more electronic messaging applications, wherein the remote server generates one or more instructions to transmit to the one or more servers managing the one or more electronic messaging applications, the one or more instructions comprising instructions to control the state of the one or more electronic messaging applications.

18. The system of claim 17, wherein the client application is further configured to:

identify, based at least in part on the session identifier, authentication credentials for the user for a first electronic messaging application of the one or more electronic messaging applications;

establish, using the authentication credentials, a communication session with a first server of the one or more servers that manages the first electronic messaging application; and transmit, via the communication session, the instruction to control the state of the first electronic messaging application.

19. A method of controlling a state of electronic messaging applications, comprising:

detecting, by one or more processors, a launch of a network application via an embedded web browser, the network application associated with a session identifier of a user;

identifying, by the one or more processors, one or more electronic messaging applications on a client device;

providing, by the one or more processors and responsive to the launch of the network application associated with the session identifier, an instruction to one or more servers managing the one or more electronic messaging applications to control a state of the one or more electronic messaging applications; and transmitting, by the one or more processors to a remote server, the instruction to control the state of the one or more electronic messaging applications, wherein the remote server generates one or more instructions to transmit to the one or more servers managing the one or more electronic messaging applications, the one or more instructions comprising instructions to control the state of the one or more electronic messaging applications.

20. The method of claim 19, further comprising:

identifying, by the one or more processors and based at least in part on the session identifier, authentication credentials for the user for a first electronic messaging application of the one or more electronic messaging applications;

establishing, by the one or more processors and using the authentication credentials, a communication session with a first server of the one or more servers that manages the first electronic messaging application; and transmitting, by the one or more processors and via the communication session, the instruction to control the state of the first electronic messaging application.

* * * * *